United States Patent
Kusafuka et al.

[11] Patent Number: 5,769,753
[45] Date of Patent: Jun. 23, 1998

[54] CONTROL SYSTEM FOR AUTOMATIC TRANSMISSION

[75] Inventors: Muneo Kusafuka, Anjo; Kazuhiro Mikami, Kariya; Yoshihisa Yamamoto; Hiroshi Tsutsui, both of Nishio; Akihito Iwata, Hekinan, all of Japan

[73] Assignee: Aisin AW Co., Ltd., Japan

[21] Appl. No.: 550,965

[22] Filed: Oct. 31, 1995

[30] Foreign Application Priority Data

Oct. 31, 1994 [JP] Japan ................................. 6-290571

[51] Int. Cl.$^6$ .............................................. F16H 61/20
[52] U.S. Cl. ........................................ 477/116; 477/117
[58] Field of Search ................... 477/62, 64, 114, 477/116, 117, 156, 93

[56] References Cited

U.S. PATENT DOCUMENTS

| | | | |
|---|---|---|---|
| 4,709,792 | 12/1987 | Sakai et al. | 192/0.044 |
| 4,718,575 | 1/1988 | Yamaguchi et al. | 192/0.052 |
| 4,775,938 | 10/1988 | Hiramatsu | 477/114 X |
| 4,982,622 | 1/1991 | Yamamoto et al. | 477/116 X |

FOREIGN PATENT DOCUMENTS

| | | | |
|---|---|---|---|
| 61-21458 | 1/1986 | Japan . | |
| 5-79562 | 3/1993 | Japan | 477/114 |
| 5-280626 | 10/1993 | Japan | 477/117 |
| 6-109130 | 4/1994 | Japan | 477/116 |

*Primary Examiner*—Khoi Q. Ta
*Attorney, Agent, or Firm*—Lorusso & Loud

[57] ABSTRACT

A control system for an automatic transmission which includes a fluid transmission unit. The control system includes a clutch applied in a forward running range; a hydraulic servo for applying the clutch responsive to an oil pressure; input and output R.P.M. sensors for detecting the input and output R.P.M.s of the fluid transmission unit; a stop state detector for detecting that the vehicle is stopped; a start detector for detecting start of the vehicle from a stop; and a control unit for controlling the oil pressure fed to the hydraulic servo. The oil pressure of the hydraulic servo is reduced, when the vehicle is stopped, to establish a neutral control state in which the clutch is released. A completely applied state of the clutch is established by boosting the oil pressure fed to the hydraulic servo when the shift of the vehicle from a stop to start is detected, in two stages. In the first stage the oil pressure fed to the hydraulic servo is boosted by adding a set shelf pressure to the base pressure until the clutch comes into a partially applied state and then, in the second stage, the oil pressure fed to the hydraulic servo is further boosted until the clutch becomes completely applied.

11 Claims, 21 Drawing Sheets

FIG. 3

| | SOLENOID | | | CLUTCH | | | BRAKE | | | | ONE-WAY CLUTCH | | |
|---|---|---|---|---|---|---|---|---|---|---|---|---|---|
| | S1 | S2 | S3 | C1 | C2 | C3 | B1 | B2 | B3 | B4 | F1 | F2 | F3 |
| R | × | ○ | × | × | ○ | × | × | × | ○ | ○ | × | × | × |
| N | × | ○ | × | × | × | × | × | × | × | ○ | × | × | × |
| D 1ST | × | ○ | △ | ○ | × | × | × | × | (○) | ○ | × | ○ | ○ |
| D 2ND | ○ | ○ | △ | ○ | × | × | ○ | ○ | × | ○ | ○ | × | ○ |
| D 3RD | ○ | × | × | ○ | × | ○ | ○ | ○ | × | × | ○ | × | × |
| D 4TH | × | × | × | ○ | ○ | ○ | × | ○ | × | × | × | × | × |

CONTROL SYSTEM FOR AUTOMATIC TRANSMISSION

BACKGROUND OF THE INVENTION

1. Field of the Invention

The present invention relates to a control system for an automatic transmission.

2. Prior Art

A typical prior art automatic transmission includes a torque converter, acting as a fluid transmission unit for receiving the rotation generated by an engine, and a speed change unit for changing the speed of the rotation transmitted from the torque converter. The speed change unit has a planetary gear unit composed of gear elements for changing the speed in accordance with a shift pattern determined in accordance with the vehicle speed, the throttle opening and so on.

The automatic transmission allows for selection of ranges including a P (parking) range, a R (reverse) range, a N (neutral) range, a D (drive) range, a S (second) range and a L (low) range. If the range is changed from the N-range to the D-range by the shift lever, for example, the rotation of the engine at idle is transmitted through the torque converter to the gear change unit, to cause a "creep phenomenon" wherein the vehicle inches forward without the accelerator pedal being depressed.

The prior art seeks to prevent such a creep phenomenon by releasing a forward clutch, i.e. a first clutch which is applied in the forward ranges of the speed change unit (as disclosed in Japanese Patent Laid-Open No. 21458/1986). The release of the first clutch is effected by reducing the oil pressure of the hydraulic servo of the first clutch when one of the D-range, the S-range and the L-range (hereinafter "forward running range") is selected while the vehicle is substantially stopped.

If the oil pressure fed to the hydraulic servo of the first clutch is abruptly boosted to shift the first clutch from a released state to a completely applied state, the engine R.P.M. drops, or a serious shock occurs as the first clutch is applied. On the other hand, if the oil pressure fed to the hydraulic servo of the first clutch is gradually boosted, the time period until the end of the application of the first clutch is prolonged to cause engine racing.

Thus, an oil pressure lower than that at the end of the application of the first clutch is fed to the hydraulic servo for a predetermined time period to establish a partially applied state, and the oil pressure is then boosted to end the application of the first clutch. In this case, the oil pressure for establishing the partially applied state is set by adding a shelf pressure to the oil pressure (hereinafter "base pressure") at the instant when the starting action is detected. The shelf pressure is set to avoid both engaging shock and engine racing.

In the control system for the automatic transmission of the prior art, however, the oil pressure fed to the hydraulic servo is fed back and slightly adjusted so as to maintain the released state of the first clutch. As a result, the aforementioned base pressure fluctuates to cause engaging shock and engine racing.

For example, if the application is started when the first clutch is in a relatively released state, the time period for completing the application of the first clutch is prolonged because of the low base pressure so that engine racing occurs. On the other hand, if application is started when the first clutch is in a relatively applied state, engaging shock is caused because of the high base pressure.

SUMMARY OF THE INVENTION

The present invention has as its objective solution of the aforementioned problems of the prior art control systems, i.e. to provide a control system for an automatic transmission which is free from engaging shock and engine racing in the case of a transition of a first clutch from the released state to the completely applied state.

In order to achieve the above-described objective, the present invention, in one aspect, provides a control system for an automatic transmission, including a fluid transmission unit, which includes: a clutch which is applied responsive to selection of a forward running range; a hydraulic servo for applying the clutch when fed with an oil pressure; an input R.P.M. sensor for detecting the input R.P.M. of the fluid transmission unit; an output R.P.M. sensor for detecting the output R.P.M. of the fluid transmission unit; stop state detection means for detecting that the vehicle has stopped; start detection means for detecting a shift of the vehicle from stopped to start; and a control unit for controlling the oil pressure fed to the hydraulic servo. The oil pressure of the hydraulic servo is reduced, when the vehicle is at a stop, to establish a neutral control state in which the clutch is released.

The control system further includes clutch release means for releasing the clutch by reducing the oil pressure fed to the hydraulic servo, responsive to detection of a stop, and clutch application means for completely applying the clutch by boosting the oil pressure fed to the hydraulic servo, when a shift of the vehicle from a stop to start is detected.

The clutch release means includes: differential rotation calculation means for calculating the difference between the input R.P.M. of the fluid transmission unit and the output R.P.M. of the fluid transmission unit ("differential rotation"); differential rotation change decision means for deciding whether or not the differential rotation has changed; pressure boosting means for boosting the oil pressure fed to the hydraulic servo if it is decided that the differential rotation has not changed; pressure reducing means for reducing the oil pressure fed to the hydraulic servo if it is decided that the differential rotation has changed; and base pressure storage means for storing the detected oil pressure, before reduction, as a base pressure, when the oil pressure fed to the hydraulic servo is boosted by the pressure boosting means and then reduced by the pressure reducing means.

On the other hand, the clutch application means includes: first clutch pressure boosting means for boosting the oil pressure fed to the hydraulic servo, by adding set shelf pressure increments to the base pressure until the clutch comes into a partially applied state after detection of a shift of the vehicle from a stop to start; and second clutch pressure boosting means for further boosting the oil pressure fed to the hydraulic servo, until the clutch becomes completely applied subsequent to the partially applied state.

Preferably, the control system of the present invention also includes an oil temperature sensor for detecting the oil temperature of the automatic transmission. If the oil temperature is excessively low, for example, the viscosity of the oil is far higher than ordinary and causes a high dragging resistance. The result may be an erroneous decision that the application of the clutch has been started when the clutch application has not actually started. In this case, the base pressure storage means stores an oil pressure, as the base pressure, which is lower than that for the actual start of the clutch application. As a result, the time period until the end of the clutch application is prolonged to cause engine racing due to the delay in the engagement. Therefore, if the oil temperature is lower than the set value, the oil pressure corresponding to the normal oil temperature, as stored, is used as the base pressure. As a result, it is possible to prevent engine racing.

The base pressure storage means updates the base pressure if the oil temperature is higher than the set value, each time the oil pressure fed to the hydraulic servo is boosted by the pressure boosting means and then reduced by the pressure reducing means, and holds the stored base pressure without change if the oil temperature is lower than the set value. Thus, if the oil pressure fed to the hydraulic servo is boosted by the pressure boosting means and then reduced by the pressure reducing means, the oil pressure before reduction is used as the base pressure. When the oil pressure fed to the hydraulic servo is boosted by the pressure boosting means and then reduced by the pressure reducing means, the clutch just starts to be applied. Therefore, if the oil pressure before reduction is used as the base pressure, the oil pressure at the instant of starting the application of the clutch is used as the base pressure. Thus, the oil pressure at the time of starting the clutch application is used as the base pressure so that the base pressure will not fluctuate and the partially applied state of the clutch can be stably achieved at all times. This makes it possible to prevent engaging shock and engine racing.

When the oil pressure controlled by the control system is fed to the hydraulic servo the clutch is applied, whereby the rotation of the engine is transmitted to the speed change unit through the fluid transmission unit and the clutch.

While the clutch is released, the oil pressure fed to the hydraulic servo can be boosted to apply the clutch, if the difference between the input R.P.M. and the output R.P.M. has not changed, but can be reduced to release the clutch if the difference has changed. Moreover, when the oil pressure fed to the hydraulic servo is reduced, the oil pressure before the reduction is used as the base pressure.

When start of a shift of the vehicle from stop to start state is detected, the shelf pressure, as set to the base pressure, is fed to the hydraulic servo so that the oil pressure is boosted to bring the clutch into a partially applied state. Subsequently, the oil pressure fed to the hydraulic servo is further boosted to bring the clutch into the completely applied state.

BRIEF DESCRIPTION OF THE DRAWINGS

FIG. 3 is a table of the operations of the embodiment of FIG. 1;

DESCRIPTION OF THE PREFERRED EMBODIMENTS

Preferred embodiments of the present invention will now be described in detail with reference to FIG. 1.

Figure 1:
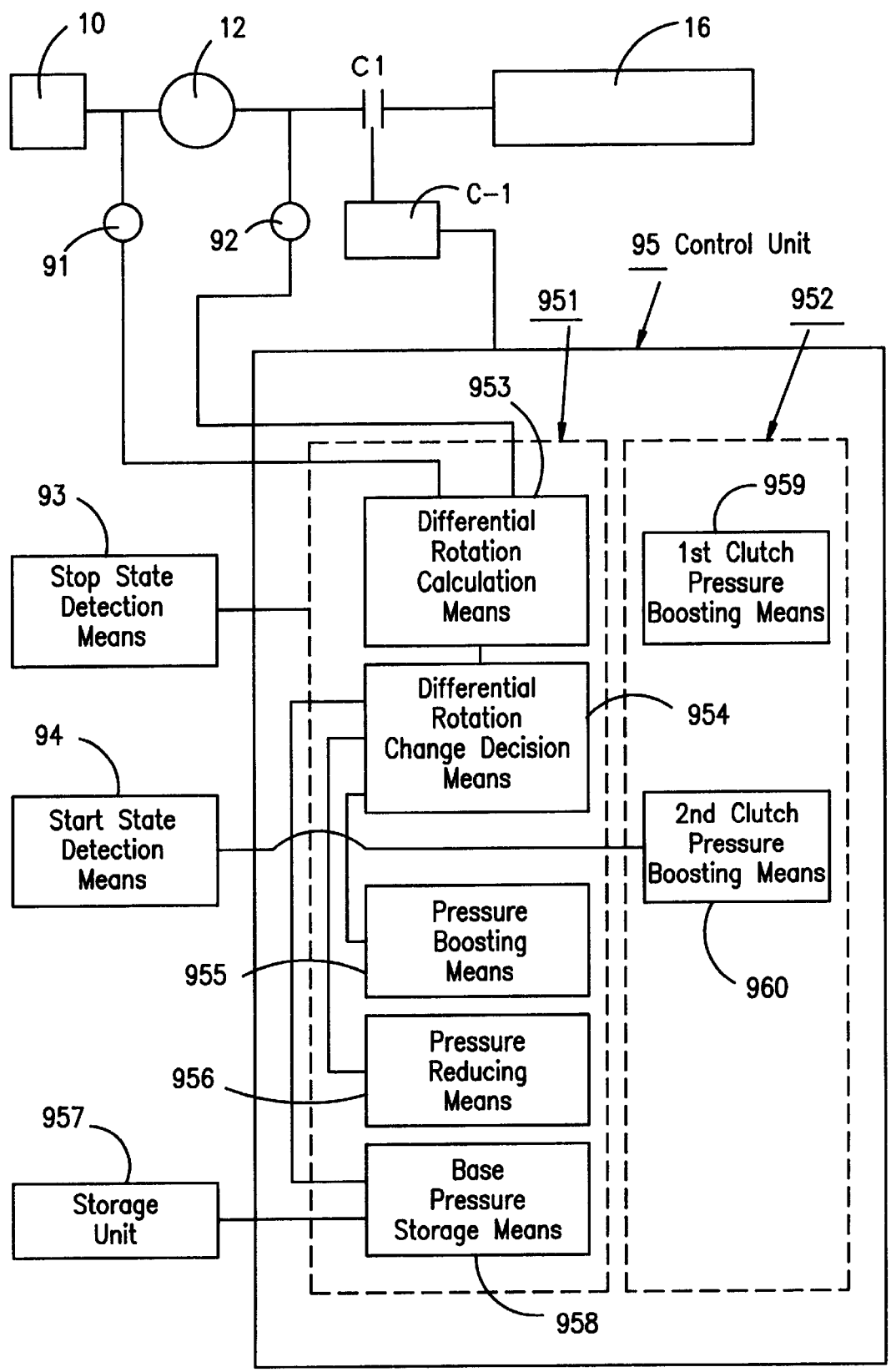
FIG. 1 is a block diagram of a control system for an automatic transmission according to an embodiment of the present invention.

As shown in FIG. 1, the automatic transmission includes: a torque converter 12 acting as a fluid transmission unit for transmitting the rotation of engine 10 to a speed change unit 16; a first clutch C1 which is applied when a forward running range is selected; a hydraulic servo C-1 for applying the first clutch C1 upon receipt of oil pressure; an input R.P.M. sensor 91 for detecting the input R.P.M. of the torque converter 12; an output R.P.M. sensor 92 for detecting the output R.P.M. of the torque converter 12; stop state detection means 93 for detecting that the vehicle has stopped; start state detection means 94 for detecting the shift of the vehicle from a stop to a start; and a control unit 95 for controlling the oil pressure fed to the hydraulic servo C-1.

The control unit 95 includes: clutch release means 951 for releasing the first clutch C1 by reducing the oil pressure to the hydraulic servo C-1, when the vehicle is detected to be stopped; and clutch application means 952 for applying the first clutch C1 by boosting the oil pressure fed to the hydraulic servo C-1 when a shift of the vehicle from stop to start is detected.

The clutch release means 951 is composed of: differential rotation calculation means 953 for calculating the difference, i.e. "differential rotation," between the input R.P.M. and the output R.P.M.; differential rotation change decision means 954 for deciding whether or not the differential rotation has changed; pressure boosting means 955 for boosting the oil pressure fed to the hydraulic servo C-1 if it is decided that the differential rotation has not changed; pressure reducing means 956 for reducing the oil pressure fed to the hydraulic servo C-1 if it is decided that the differential rotation has changed; and base pressure storage means 958 for storing, in a storage unit 957, the oil pressure before reduction, as a base pressure, when the oil pressure fed to the hydraulic servo C-1 is boosted by the pressure boosting means 955 and then reduced by the pressure reducing means 956.

The clutch application means 952 is composed of: first clutch pressure boosting means 959 for boosting the oil pressure fed to the hydraulic servo C-1, by adding the shelf pressure, set to the base pressure, until the first clutch C1 is brought to a partially applied state after detection of shift of the vehicle from a stop to a start; and second clutch pressure boosting means 960 for further boosting the oil pressure fed to the hydraulic servo C-1 until the first clutch C1 becomes completely applied.

Figure 2:
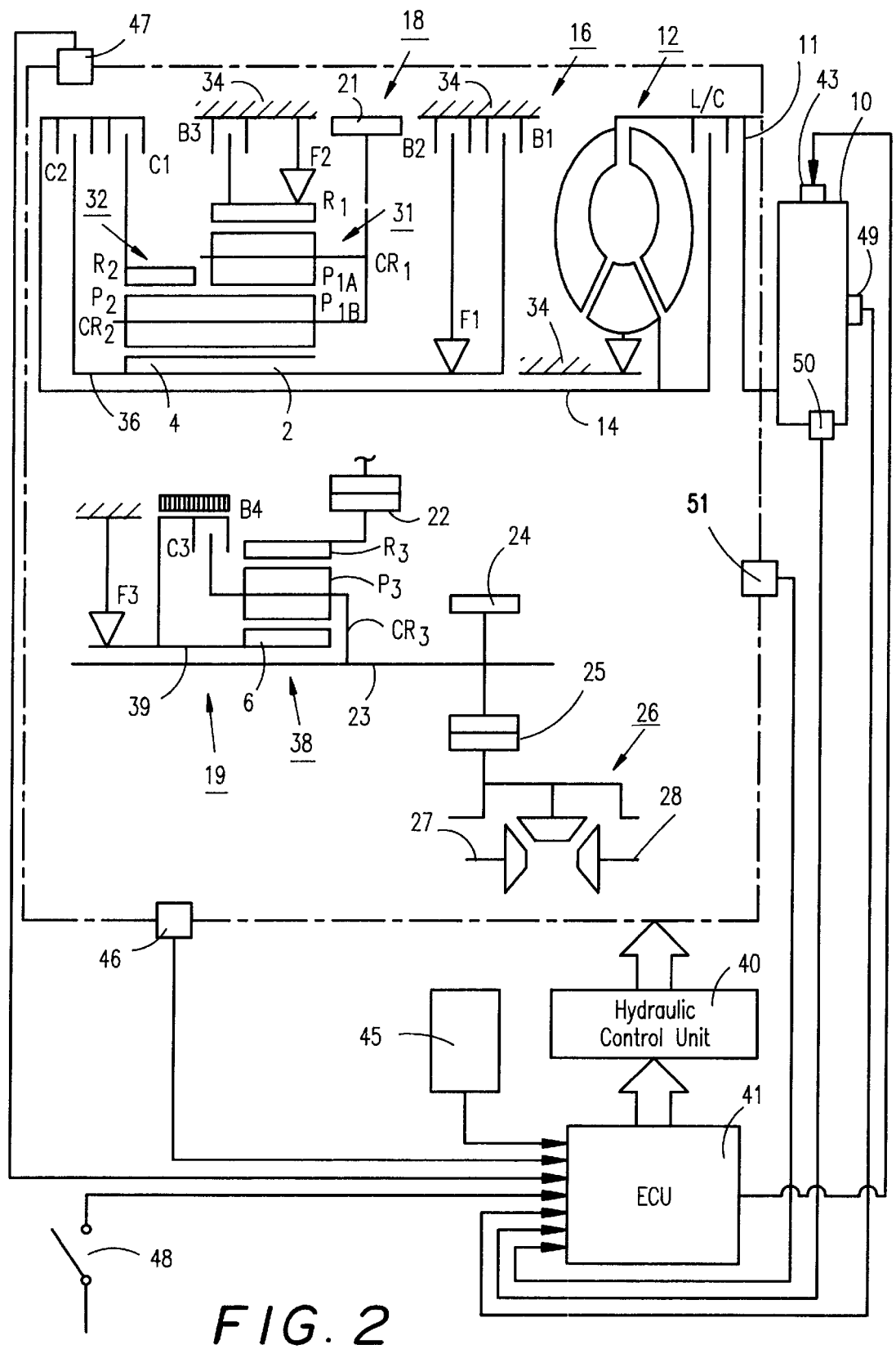
FIG. 2 is a schematic diagram of an automatic transmission in combination with a control system according to the embodiment of FIG. 1.

As shown in FIG. 2, the rotation generated by the engine 10, is transmitted through an output shaft 11 to the torque converter 12, acting as the fluid transmission unit. The torque converter 12 transmits the rotation of the engine 10 to an output shaft 14 through a fluid (or working oil). However, if the vehicle speed exceeds a set value, a lockup clutch L/C is applied so that the rotation can be transmitted directly to the output shaft 14.

The output shaft 14 is connected to the speed change unit 16. The speed change unit 16 includes a main transmission 18 for establishing three forward and one reverse gear stages, and an underdrive auxiliary transmission 19. The rotation of the main transmission 18 is transmitted through a counter drive gear 21 and a counter driven gear 22 to the auxiliary transmission 19, the output shaft 23 of which transmits its rotation through an output gear 24 and a ring gear 25 to a differential unit 26.

In differential unit 26, the rotation, as received from the output gear 24 and the ring gear 25, is differentiated so that the differential rotations are transmitted through left and right drive shafts 27 and 28 to the drive wheels (not shown).

The main transmission 18 has a first planetary gear unit 31, a second planetary gear unit 32, a first clutch C1, a second clutch C2, a first brake B1, a second brake B2, a third brake B3, a one-way clutch F1 and a one-way clutch F2 for transmitting the torque selectively between the individual components of the two planetary gear units 31 and 32.

The first planetary gear unit 31 is composed of: a ring gear R1 connected to drive unit case 34 through the third brake B3 and the one-way clutch F2, arranged in parallel; a sun gear 2 formed on a sun gear shaft 36 fitted on and rotatably supported by the outer shaft 14; a carrier $CR_1$ connected to the counter drive gear 21; and pinions $P_{1A}$ and $P_{1B}$ interposed to mesh with each other between the ring gear $R_1$ and the sun gear 2 and rotatably supported by the carrier $CR_1$.

The sun gear shaft 36 is connected through the second clutch C2 to the output shaft 14 and is further connected through the first brake B1 to the drive unit case 34 and through the one-way clutch F1 and the second brake B2, arranged in series with each other, to the drive unit case 34.

On the other hand, the second planetary gear unit 32 is composed of: a ring gear $R_2$ connected through the first clutch C1 to the output shaft 14; a sun gear 4 formed on the sun gear shaft 36 integrally with the sun gear 2; a carrier $CR_2$ connected to the carrier $CR_1$; and a pinion $P_2$ interposed to mesh with the ring gear $R_2$ and the sun gear 4, rotatably supported by the carrier $CR_2$ and formed integrally with the pinion $P_{1B}$.

The counter drive gear 21 is in meshing engagement with the counter driven gear 22 in the auxiliary transmission 19, to transmit the rotation, received from the main transmission 18, to the auxiliary transmission 19.

Auxiliary transmission 19 includes a third planetary gear unit 38, a third clutch C3, a fourth brake B4 and a one-way clutch F3 for transmitting the torque selectively between the individual components of the third planetary gear unit 38.

The third planetary gear unit 38 is composed of: a ring gear $R_3$ connected to the counter driven gear 22; a sun gear 6 formed on a sun gear shaft 39 fitted rotatably on the output shaft 23; a carrier $CR_3$ fixed on the output shaft 23; and a pinion $P_3$ interposed between the ring gear $R_3$ and the sun gear 6 and rotatably supported by the carrier $CR_3$.

The operations of the above-described automatic transmission will now be described with reference to FIG. 3 wherein: S1 is the first solenoid valve; S2 is the second solenoid valve; S3 is the third solenoid valve; C1 is the first clutch; C2 is the second clutch; C3 is the third clutch; B1 is the first brake; B2 is the second brake; B3 is the third brake; B4 is the fourth brake; and F1 to F3 are the one-way clutches. Moreover: R is reverse range; N is the neutral range; D is the drive range; 1ST is a gear stage at the 1st speed; 2ND is a gear stage at the 2nd speed; 3RD is a gear stage at the 3rd speed; and 4TH is a gear stage at the 4th speed.

Symbols "O" indicate that a first solenoid signal $S_1$, a second solenoid signal $S_2$ and a third solenoid signal $S_3$ for opening/closing the first solenoid valve S1, the second solenoid valve S2 and the third solenoid valve S3, respectively, are ON; that the first clutch C1, the second clutch C2, the third clutch C3, the first brake B1, the second brake B2, the third brake B3 and the fourth brake B4 are applied; and that the one-way clutches F1 to F3 are locked.

On the other hand, symbols "X" indicate: that the first solenoid signal $S_1$, the second solenoid signal $S_2$ and the third solenoid signal $S_3$ for opening/closing the first solenoid valve S1, the second solenoid valve S2 and the third solenoid valve S3, respectively, are OFF; that the first clutch C1, the second clutch C2, the third clutch C3, the first brake B1, the second brake B2, the third brake B3 and the fourth brake B4 are released; and that the one-way clutches F1 to F3 are free.

Incidentally, symbols "Δ" indicate ON/OFF for when the neutral control state is established, and a parenthesized circle "(O)" indicates that the third brake B3 is applied at the time of engine braking.

At the 1st speed in the D-range, the first clutch C1 and the fourth brake B4 are applied to lock the one-way clutches F2 and F3. Then, the rotation of the output shaft 14 is transmitted through the first clutch C1 to the ring gear $R_2$. In this state, the rotation of the ring gear $R_1$ is blocked by the one-way clutch F2 so that the rotation of the carrier $CR_2$ is drastically decelerated, while rotating the sun gear 4 idly, and is transmitted to the counter drive gear 21.

The rotation is transmitted from the counter drive gear 21 to the counter driven gear 22 to the ring gear $R_3$. However, the rotation of the sun gear 6 is blocked by the fourth brake B4 so that the rotation of the carrier $CR_3$ is further decelerated and transmitted to the output shaft 23.

At the 2nd speed in the D-range, on the other hand, the first clutch C1, the first brake B1, the second brake B2 and the fourth brake B4 are applied to lock the one-way clutches F1 and F3. Then, the rotation of the output shaft 14 is transmitted through the first clutch C1 to the ring gear $R_2$, and the rotation of the sun gear 4 is blocked by the second brake B2 and the one-way clutch F1. As a result, the rotation of the ring gear $R_2$ is decelerated and transmitted to the carrier $CR_2$, the rotation of which is transmitted to the counter drive gear 21 while rotating the ring gear $R_1$ idly.

As in 1ST speed, the rotation is transmitted from the counter drive gear 21 to the counter driven gear 22 and then to the ring gear $R_3$. However, in the 2nd speed also, the rotation of the sun gear 6 is blocked by the fourth brake B4 so that the rotation of the carrier $CR_3$ is decelerated and transmitted to the output shaft 23.

At the 3rd speed in the D-range, the first clutch C1, the third clutch C3, the first brake B1 and the second brake B2 are applied to lock the one-way clutch F1. Then, the rotation of the output shaft 14 is transmitted through the first clutch C1 to the ring gear $R_2$, and the rotation of the sun gear 4 is blocked by the second brake B2 and the one-way clutch F1. As a result, the rotation of the ring gear $R_2$ is decelerated and transmitted to the carrier $CR_2$ so that the rotation of the carrier $CR_2$ is transmitted to the counter drive gear 21 while rotating the ring gear $R_1$ idly.

Again, as in 1st and 2nd speeds, rotation is transmitted from the counter drive gear 21 to the counter driven gear 22 to the ring gear R3. However, the relative rotation of the carrier CR3 and the sun gear 6 is blocked by the third clutch C3 so that the third planetary gear unit 38 comes into a directly connected state. As a result, the rotation of the counter driven gear 22 is transmitted as is to the output shaft 23.

At 4th speed in D-range, the first clutch C1, the second clutch C2, the third clutch C3 and the second brake B2 are applied. Then, the rotation of the output shaft 14 is transmitted through the first clutch C1 to the ring gear $R_2$ and through the second clutch C2 to the sun gear 4, so that the first planetary gear unit 31 and the second planetary gear unit 32 come into the directly connected state. As a result, the rotation of the output shaft 11 is transmitted as is to the counter drive gear 21.

As in the lower speeds, rotation is transmitted from the counter drive gear 21 to the counter driven gear 22 to the ring gear $R_3$. However, the relative rotation of the carrier $CR_3$ and the sun gear 6 is blocked by the third clutch C3 so that the third planetary gear unit 38 comes into the directly connected state. As a result, the rotation of the counter driven gear 22 is transmitted as is to the output shaft 23.

The automatic transmission, as is conventional, also includes a hydraulic circuit for applying/releasing the first clutch C1, the second clutch C2, the third clutch C3, the first brake B1, the second brake B2, the third brake B3 and the fourth brake B4. The hydraulic circuit, in turn, is controlled by a hydraulic control unit 40. This hydraulic control unit 40 corresponds to the control unit 95 of FIG. 1.

On the other hand, the engine 10 is controlled by an electronic control unit 43.

Both the hydraulic control unit 40 and the electronic control unit 43 are connected to an automatic transmission control unit (ECU) 41 so that they are operated according to the control program of the automatic transmission control unit 41.

The automatic transmission control unit 41 receives signals from a neutral start switch (N.S.S.W.) 45, an oil temperature sensor 46, an R.P.M. sensor 47, a brake switch 48, an engine R.P.M. sensor 49, a throttle opening sensor 50 and a vehicle speed sensor 51. Incidentally, the engine R.P.M. sensor 49 and the R.P.M. sensor 47 correspond to the input R.P.M. sensor 91 and the output R.P.M. sensor 92 of FIG. 1, respectively.

Thus, the shift position of the shift lever (not shown), i.e., the selected range, is detected by the neutral start switch 45; the temperature of the oil in the hydraulic circuit is detected by the oil temperature sensor 46; and the R.P.M. of the input side of the first clutch C1, i.e., the R.P.M. of the output shaft 14 (hereinafter "clutch input side R.P.M.") $N_{C1}$, is detected by the R.P.M. sensor 47.

Moreover, depression of the brake pedal is detected by the brake switch 48; the engine R.P.M. NE is detected by the engine R.P.M. sensor 49; the throttle opening $\theta$ is detected by the throttle opening sensor 50; and the vehicle speed is detected by the vehicle speed sensor 51.

Figure 4:
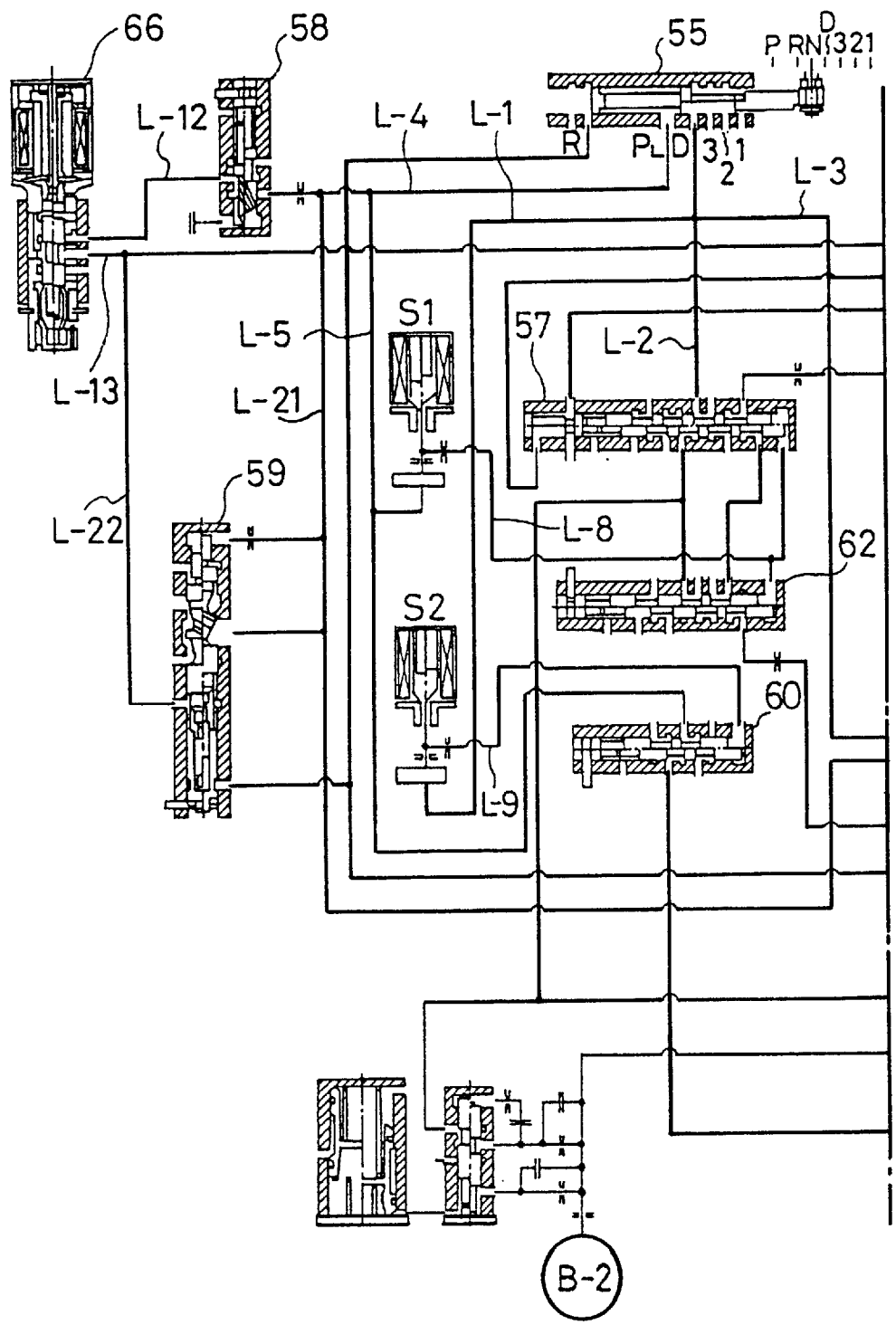
FIG. 4 is a partial circuit diagram for a hydraulic circuit for the embodiment of FIG. 1.
Figure 5:
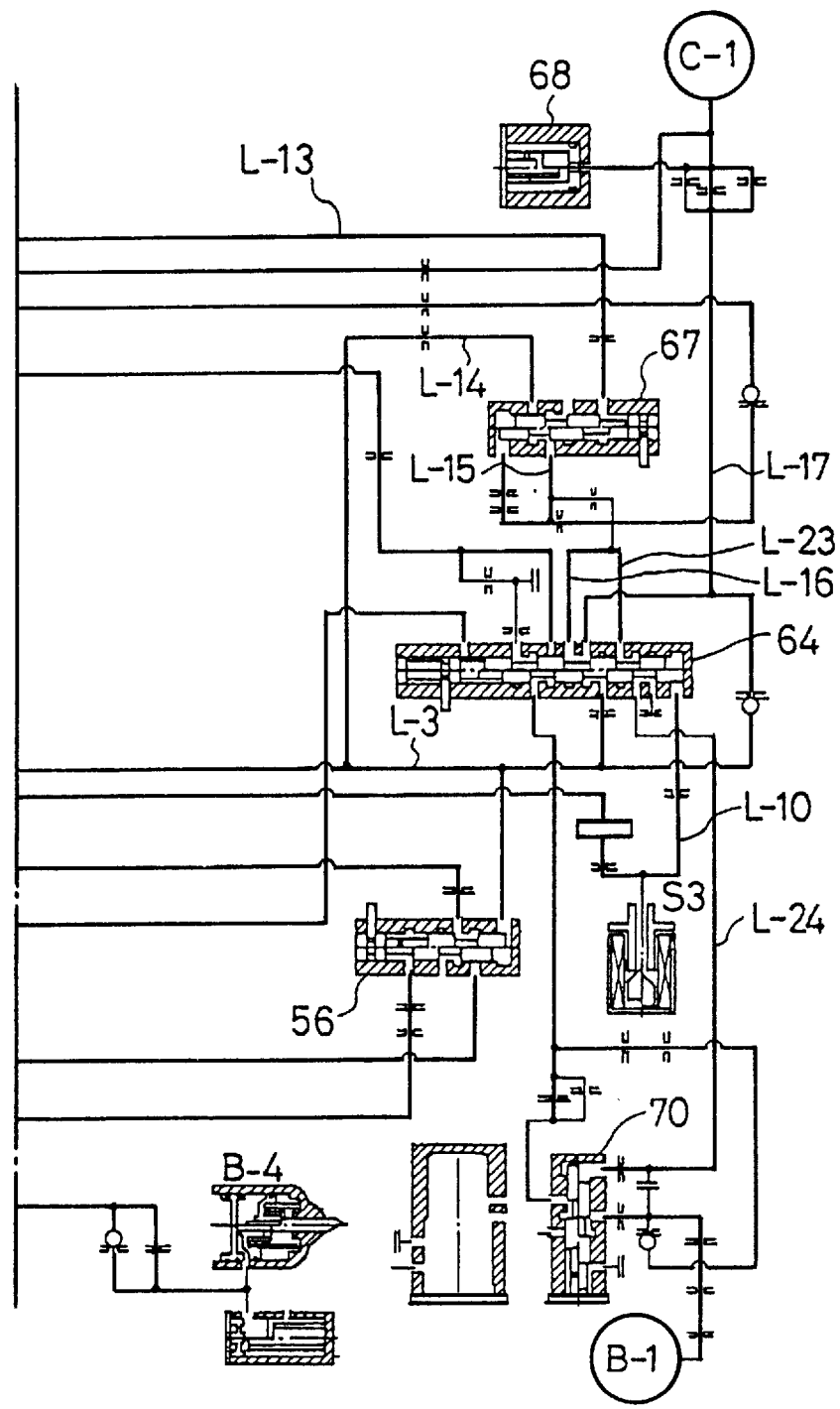
FIG. 5 is the remainder of the diagram for the hydraulic circuit of FIG. 4.

FIGS. 4 and 5 show a hydraulic circuit for use in the present invention which includes a primary valve 59 for adjusting the oil pressure coming from an oil pressure source and for outputting the adjusted oil pressure as the line pressure to a line L-21. A manual valve 55 is provided with ports 1, 2, 3, D, $P_L$ and R so that the line pressure fed from the primary valve 59 via lines L-21 and L-4 to the port $P_L$ is supplied as the 1-range pressure, the 2-range pressure, the 3-range pressure, the D-range pressure and the R-range pressure, respectively, at the ports 1, 2, 3, D and R, by operating the shift lever.

When the shift lever is placed in the forward drive position, the D-range oil pressure, supplied at port D, is fed via a line L-1 to the second solenoid valve S2, via a line L-2 to a 1–2 shift valve 57 and via a line L-3 to a B-1 sequence valve 56. On the other hand, the line pressure from the primary valve 59 is fed via the line L-21 to the third solenoid valve S3.

Moreover, the line pressure from the line L-21 is fed via the line L-4 to a solenoid modulator valve 58 and further via a line L-5 to the first solenoid valve S1 and a 2–3 shift valve 60.

The first solenoid signal S1, the second solenoid signal S2 and the third solenoid signal S3 for opening/closing the first solenoid valve S1, the second solenoid valve S2 and the third solenoid valve S3 are turned ON/OFF in response to the signals coming from the hydraulic control unit 40 (FIG. 2), so that the first solenoid valve S1 feeds the signal oil pressure via a line L-8 to the 1–2 shift valve 57 and a 3–4 shift valve 62, the second solenoid valve S2 feeds the signal oil pressure via a line L-9 to the 2–3 shift valve 60, and the third solenoid valve S3 feeds the signal oil pressure via a line L-10 to a neutral relay valve 64.

The 1–2 shift valve 57 takes the depicted upper half position in the 1st speed and the depicted lower half position in the 2nd ton 4th speeds; the 2–3 shift valve 60 takes the lower half position at the 1st and 2nd speeds and the upper half position at the 3rd and 4th speeds; the 3–4 shift valve 62 takes the upper half position at the 1st and 4th speeds and the lower half position at the 2nd and 3rd speeds; and the neutral relay valve 64 takes the upper half position in the neutral control state and the lower half position at the 1st to 4th speeds.

The solenoid module valve 58 is connected via a line L-12 to a linear solenoid valve 66, which is connected via a line L-13 to a C-1 control valve 67. The linear solenoid valve 66 is further connected via a line L-22 to the primary valve 59.

In response to the signal from the hydraulic control unit 40, the linear solenoid valve 66 is controlled to feed a throttle pressure PTH as the control oil pressure to the control valve 67 via the line L-13. On the other hand, the C-1 control valve 67 is fed with the D-range pressure via the lines L-3 and L-14, adjusts the received D-range pressure to an oil pressure $P_{C1}$ (hereinafeter the "C-1 oil pressure"), in accordance with the throttle pressure $P_{TH}$ coming from the linear solenoid valve 66, and feeds the adjusted oil pressure $P_{C1}$ through line L-15 and through the neutral relay valve to the hydraulic servo C-1.

The B-1 sequence valve 56 has a spring, located at its left end, applying a load on the spool, and a control oil chamber, located at its right end. The control oil chamber of the B-1 sequence valve 56 receives the D-range pressure via the line L-3 and takes the lower half position at the 1st speed. When the oil pressure is fed at the 2nd speed to the hydraulic servo B-2 so that its pressure rises, the B-1 sequence valve 56 is fed with the sequence pressure from the hydraulic servo B-2 so that it has its spool pushed to the right by the sequence pressure and the spring load to take the upper half position.

As a result, the oil pressure from the 1–2 shift valve 57 is fed through the B-1 sequence valve 56 to the 3–4 shift valve 62 and further through the 1–2 shift valve 57 and the neutral relay valve 64 to a hydraulic servo B-1. Thus, the hydraulic servo B-1 receives an oil pressure in accordance with the rise of the oil pressure in the hydraulic servo B-2.

The neutral relay valve 64 takes the upper half position when in the neutral control state. In this neutral control state, therefore, the C-1 oil pressure $P_{C1}$ is fed through line L-15, line L-16, neutral relay valve 64 and line L-17 to the hydraulic servo C-1. Moreover, the oil at the C-1 oil pressure $P_{C1}$ is fed via lines L-23 and L-24 to a B-1 control valve 70.

The neutral relay valve 64 takes the lower half position at the 1st to 4th speeds. At the 1st to 4th speeds, therefore, oil at D-range pressure is fed through the line L-3, the neutral relay valve 64 and the line L-17 to the hydraulic servo C-1. In the neutral control state, on the other hand, the neutral relay valve 64 is switched to the upper half position to connect the line L-16 and the line L-17.

A damper valve 68 is provided in the line L-17 for smoothing the discharge pressure of the oil from the hydraulic servo C-1. Hydraulic servo B-1 operates the first brake B1. Hydraulic servo B-2 operates the second brake B2. Hydraulic servo B-4 operates the fourth brake B4.

Figure 6:
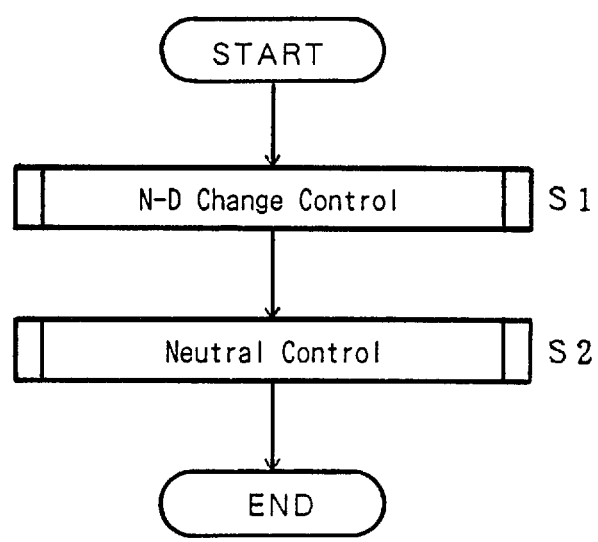
FIG. 6 is a main flow chart showing the operations of the automatic transmission control system of the embodiment of FIG. 1.

In the main routine, illustrated in FIG. 6, simultaneously as the ignition of the engine 10 (FIG. 2) is turned ON, the main routine is started to repeat the N–D change control and the neutral control until the ignition is turned OFF.

Step S1: The N–D change control is executed; and
Step S2: The neutral control is executed.

Figure 7:
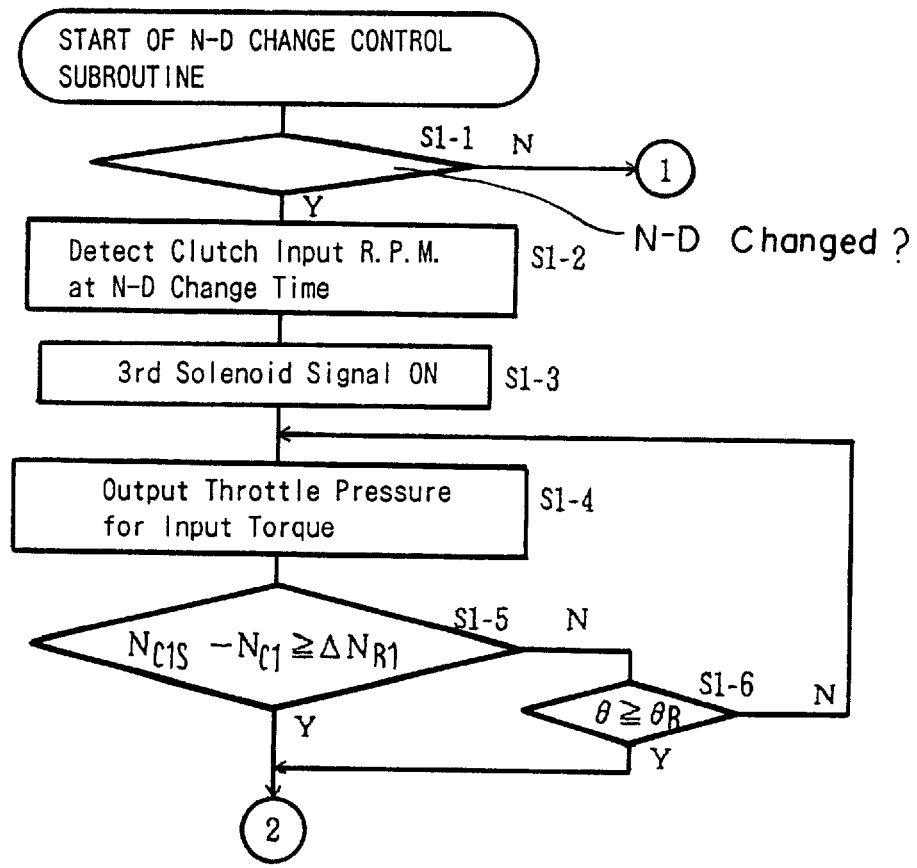
FIG. 7 is a flow chart of the N–D change control subroutine which is step S1 in the main routine of FIG. 6.
Figure 8:
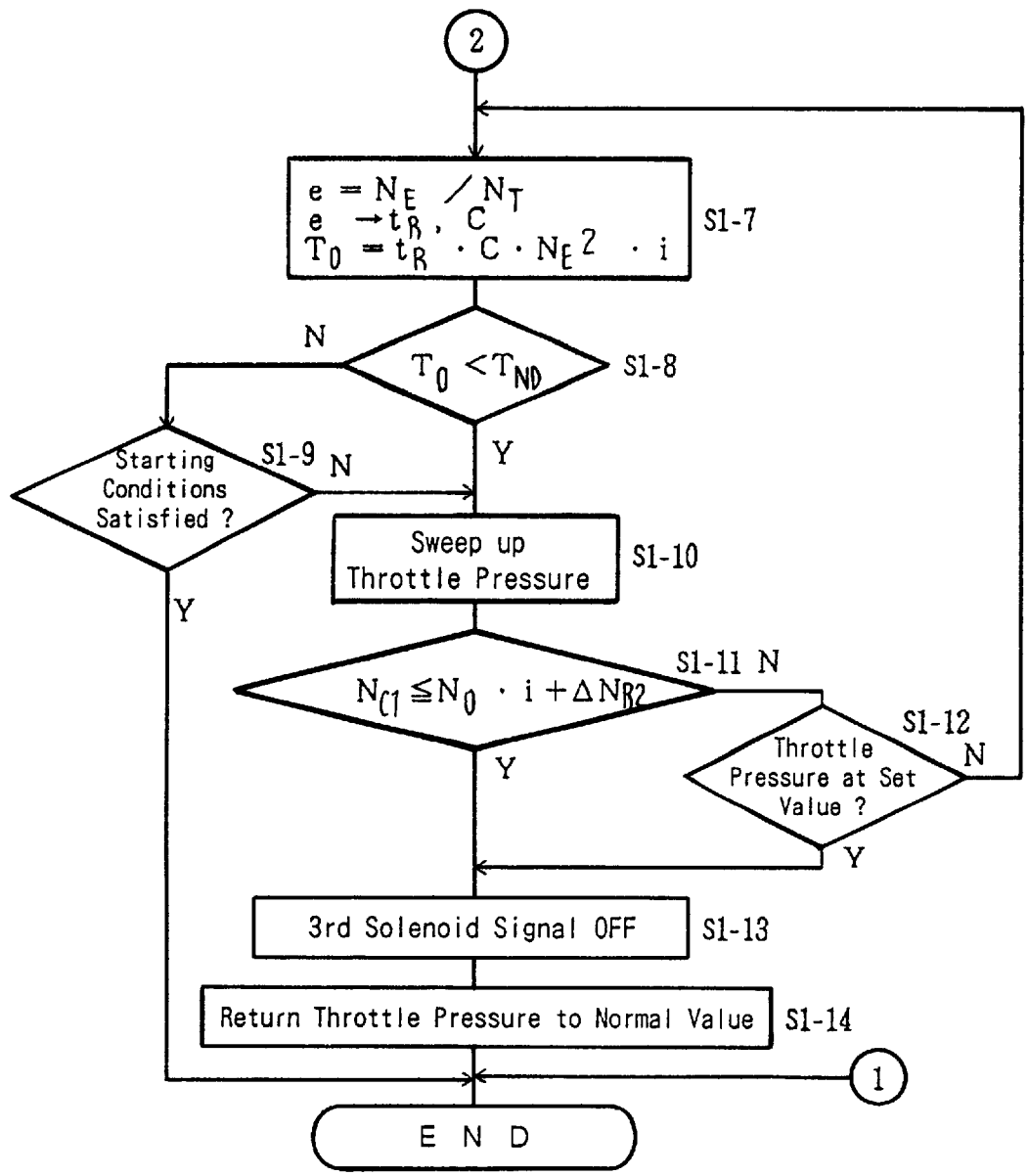
FIG. 8 is a flow chart which is a continuation of the N–D change control subroutine of FIG. 7.
Figure 9:
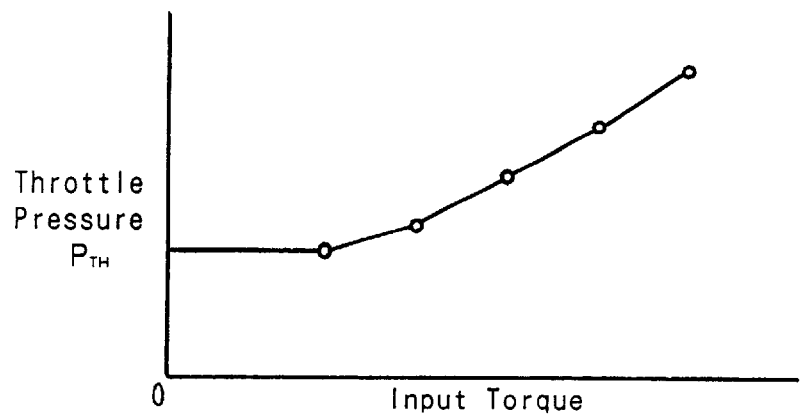
FIG. 9 is a graph of the relationship between input torque and throttle pressure in the embodiment of FIG. 1.
Figure 10:
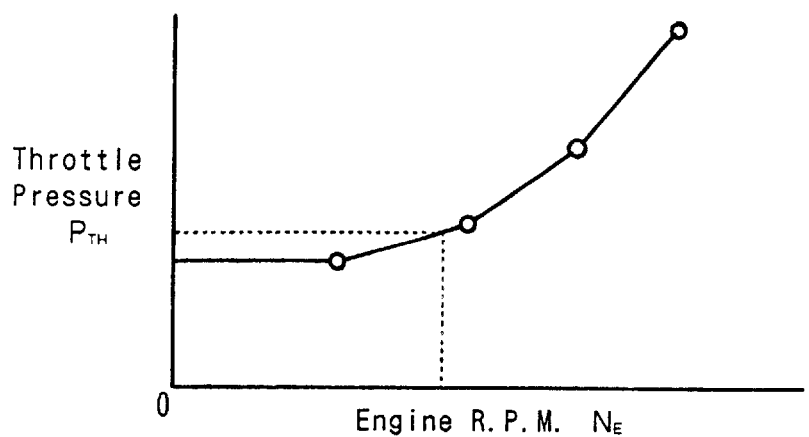
FIG. 10 is a graph of the relationship between engine R.P.M. and throttle pressure in the embodiment of FIG. 1.
Figure 11:
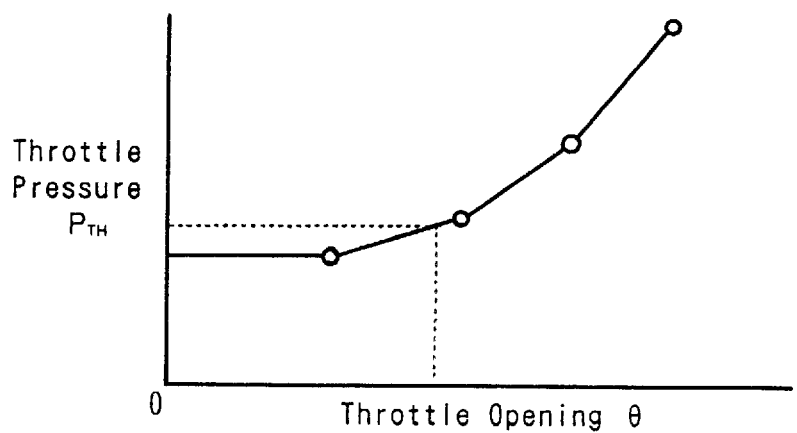
FIG. 11 is a graph of the relationship between throttle opening and throttle pressure in the embodiment of FIG. 1.
Figure 12:
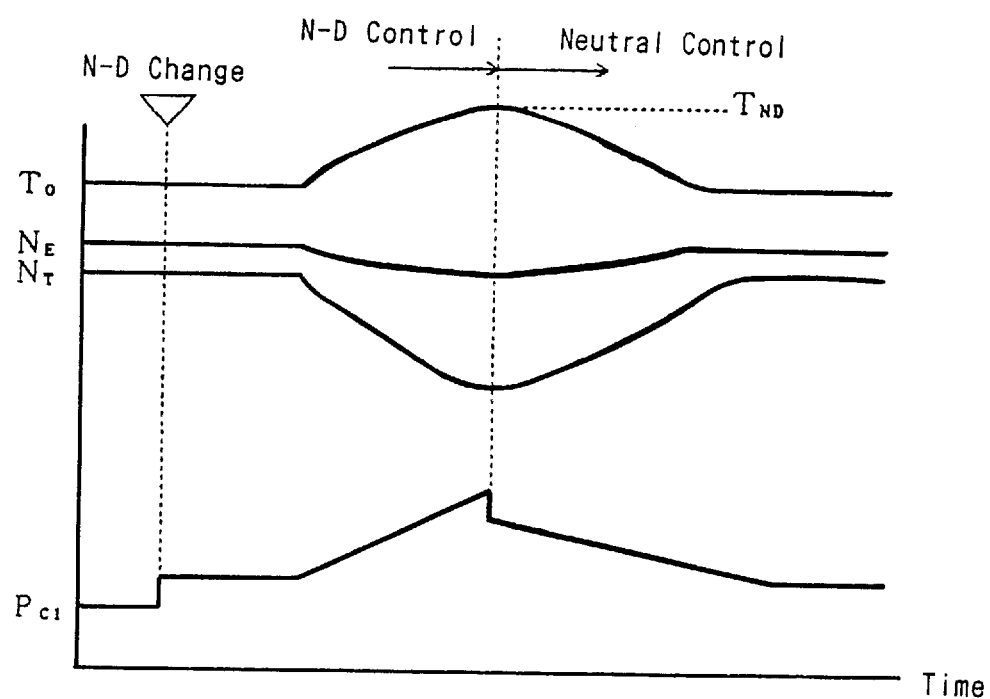
FIG. 12 is a time chart for the N–D change control subroutine of FIGS. 7 and 8.

The N–D change control subroutine of Step S1 of FIG. 6 will now be described with reference to FIGS. 7–11. In FIG. 7:

Step S1-1: The start detection means 94 (FIG. 1) decides, on the basis of the signal from the neutral start switch 45 (FIG. 2), whether or not the N–D change has been initiated by starting from a stop. This N–D change control subroutine advances to Step S1-2, if the N–D change has been made, but is ended if NOT.

Step S1-2: The clutch input side R.P.M. NC1S at the N–D change time is detected by the input R.P.M. sensor 91.

Step S1-3: The third solenoid signal S3 for opening/closing the third solenoid valve S3 is turned ON.

Step S1-4: The throttle pressure $P_{TH}$ according to the input torque is output with reference to the map of FIG. 9. On the other hand, the throttle pressure $P_{TH}$ is output at idling ON with reference to the map of FIG. 10 and at idling OFF with reference to the map of FIG. 11.

Step S1-5: The current clutch input side R.P.M. $N_{C1}$ is detected, and it is decided whether or not the difference between the clutch input side R.P.M. $N_{C1S}$ at the time of a N–D change, and the detected clutch input side R.P.M. $N_{C1}$ ($N_{C1S}-N_{C1}$) exceeds a set value $\Delta N_{R1}$. The subroutine advances to Step S1-7, if the value ($N_{C1S}-N_{C1}$) is over the set value $\Delta N_{R1}$, but to Step S1-6 if the value ($N_{C1S}-N_{C1}$) is below the set value $\Delta N_{R1}$.

Step S1-6: It is decided whether or not the throttle opening $\theta$ is over a set value $\theta_R$. The subroutine advances to Step S1-7, if the throttle opening $\theta$ is over the set value $\theta_R$, but returns to Step S1-4 if the throttle opening $\theta$ is below the set value $\theta_R$.

$\Delta N_{R1}$ is set to the value at which the first clutch C1 starts its application (or engagement) after the piston of the hydraulic servo C-1 has reached the end of its stroke, and $\theta^R$ is set to a value which indicates that the driver intends to start.

Thus, in the state where the first clutch C1 has not yet started to engage, the subroutine advances to Step S1-7 when the accelerator pedal is depressed to increase the throttle opening $\theta$.

Step S1-7: The speed ratio e of the torque converter 12 is calculated from the engine R.P.M. $N_E$ and the turbine R.P.M. $N_T$ using the following Equation:

$$e = N_E/N_T. \qquad (I)$$

A map is utilized to read out a torque ratio $t_R$ and a capacity coefficient C which correspond to the speed ratio e, and an output torque $T_O$ is calculated by the following Equation, in which letter i designates the gear ratio of the speed change unit 16:

$$T_O = t_R \cdot C \cdot N_E^2 \cdot i$$

Step S1-8: It is decided whether or not the output torque $T_O$ is below a preset N–D control end torque $T_{ND}$. The subroutine advances to Step S1-10, if the output torque $T_O$ is below the preset N–D control end torque $T_{ND}$, but to Step S1-9 if the output torque $T_O$ is over the preset N–D control end torque $T_{ND}$.

Step S1-9: It is decided whether or not the neutral control starting conditions are satisfied. The subroutine is ended to quickly execute the neutral control of Step S2 of FIG. 6, if all the starting conditions are satisfied, but advances to Step S1-10 if NOT.

The starting conditions which must be satisfied are: the accelerator pedal is released so that the throttle opening $\theta$ is below a predetermined value; the oil temperature detected by the oil temperature sensor 46 is over a predetermined value; and the brake pedal is depressed to turn ON the brake switch 48.

Step S1-10: The throttle pressure $P_{TH}$ is swept up. In this case, the application of the first clutch C1 is continued by changing the control oil pressure from the linear solenoid valve 6 (FIG. 4) to boost the C-1 oil pressure $P_{C1}$ and by boosting the C-1 oil pressure $P_{C1}$ by a set pressure $\Delta P$ each lapse of time t.

Step S1-11: It is decided on the basis of the output R.P.M. $N_O$ of the speed change unit 16 whether or not the application of the first clutch C1 has ended. In this case, the R.P.M. of the output side of the first clutch C1 is estimated as $N_O \cdot i$, wherein i is the gear ratio of the speed change unit 16. Hence, it is decided whether or not the clutch input side R.P.M. $N_{C1}$ is smaller than the sum of the output side R.P.M. $N_O \cdot i$ and a set value $\Delta N_{R2}$:

$$N_{C1} \leq N_O \cdot i + \Delta N_{R2}.$$

The subroutine advances to Step S1-13, if the application of the first clutch C1 has ended, but to Step S1-12 if NOT.

Step S1-12: It is decided whether or not the throttle pressure $P_{TH}$ has reached a set value $P_{THR}$. The subroutine advances to Step S1-13, if the throttle pressure $P_{TH}$ has reached the set value $P_{THR}$, but returns to Step S1-7, if NOT.

Step S1-13: The third solenoid signal $S_3$ is turned OFF.

Step S1-14: The throttle pressure $P_{TH}$ is returned to the normal value corresponding to the gear stage, the throttle opening θ and so on.

In the N–D change, the application of the first clutch C1 is started when the third solenoid signal $S_3$ for opening/closing the third solenoid valve S3 (FIG. 5) is turned ON so that the C-1 oil pressure PC1 corresponding to the input torque is fed to the hydraulic servo C-1. Then, as the clutch input side R.P.M. NC1 is reduced and as the throttle opening θ is increased by depression of the accelerator pedal by the driver, the C-1 oil pressure PC1 is gradually boosted.

At the end of the application of the first clutch C1, the third solenoid signal $S_3$ is then turned OFF to start the vehicle.

Meanwhile, the output torque $T_O$ is calculated, and it is decided if the starting conditions for neutral control are satisfied, when the calculated output torque $T_O$ is over the N–D control ending torque $T_{ND}$. If the starting conditions are satisfied, the subroutine quickly shifts to the neutral control. In case the N–D change is made, therefore, performance is improved because the neutral control is not started before the output torque TO exceeds the N–D control ending torque TND so that the driver feels the N–D change.

After the N–D change, the subroutine quickly goes to the neutral control if the conditions for starting the neutral control are satisfied, so that the effects of reduction of fuel consumption and suppression of the vibration are enhanced.

Figure 13:
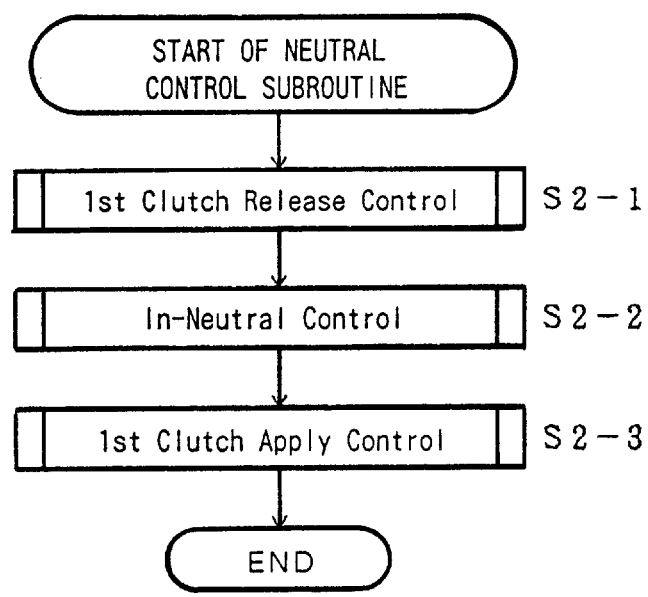
FIG. 13 is a flow chart of the neutral control subroutine which is step S2 of the main routine of FIG. 6.
Figure 25:
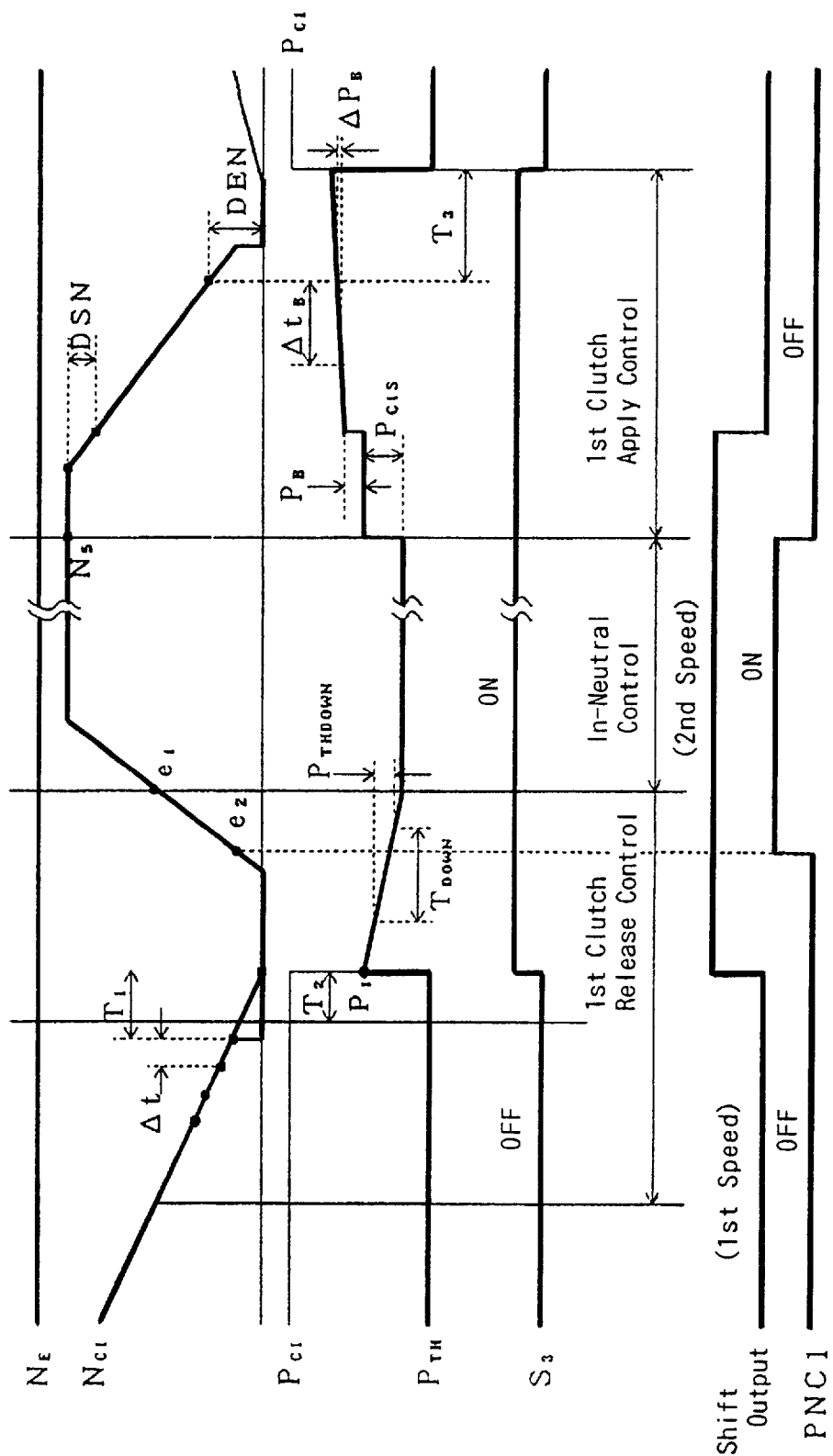
FIG. 25 is a time chart of control operations in the embodiment of FIG. 1.

The neutral control subroutine which is Step S2 of FIG. 6 will now be described with reference to FIGS. 13 and 25. In FIG. 13:

Step S2-1: The release state establishing means 951 (FIG. 1) executes the first clutch release control. In this case, with the vehicle speed zero being assumed at zero, the 2nd speed shift output signal is issued at a set time to start the applications of the second brake B2 (FIG. 2) and the third brake B3, to thereby effect the hill hold control. Further, the throttle pressure $P_{TH}$ is swept down at a set timing.

For these operations, the engine R.P.M. $N_E$ corresponding to the input torque is determined, and the throttle pressure $P_{TH}$, corresponding to the engine R.P.M. $N_E$, is determined and set to a set oil pressure $P_1$ so that the C-1 oil pressure $P_{C1}$ is also set to $P_1$ and then is gradually reduced.

The input torque can be detected, not only from the engine R.P.M. $N_E$, but also indirectly from the engine air intake, the fuel injection rate and so on. Moreover, the input torque of the speed change unit 16 can also be directly detected by a torque sensor (not-shown). In this case, the torque sensor is attached to the output shaft 14 of the torque converter 12.

Step S2-2: The clutch release means 951 executes the in-neutral control to establish the neutral control state. Here, stabilization of the engine R.P.M. $N_E$ and the clutch input side $N_{C1}$ is awaited and the C-1 oil pressure $P_{C1}$ is then boosted or reduced by set pressure increments on the basis of those stabilized values for engine R.P.M. $N_E$ and clutch input side R.P.M. $N_{C1}$.

Step S2-3: The clutch application means 952 executes the first clutch apply control. In this case, the C-1 oil pressure $P_{C1}$ is boosted by set increments, which are determined on the basis of the throttle opening, the engine R.P.M. $N_E$ and so on, to complete the piston stroke of the hydraulic servo C-1 (FIG. 5). After the completion of the piston stroke of the hydraulic servo C-1, the C-1 oil pressure $P_{C1}$ is boosted by the set pressure increments to prevent shock.

Figure 14:
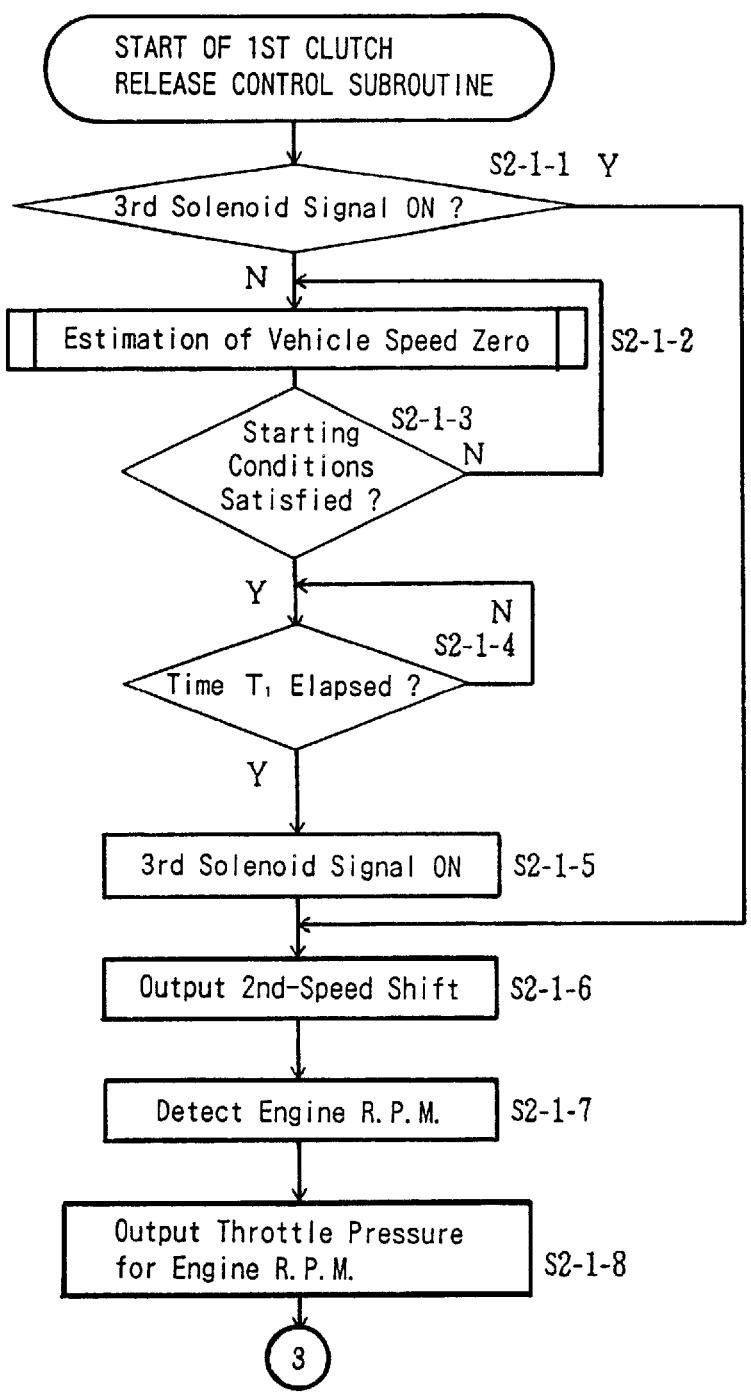
FIG. 14 is a flow chart of the first clutch release control subroutine which is step S2-1 in the subroutine of FIG. 13.
Figure 15:
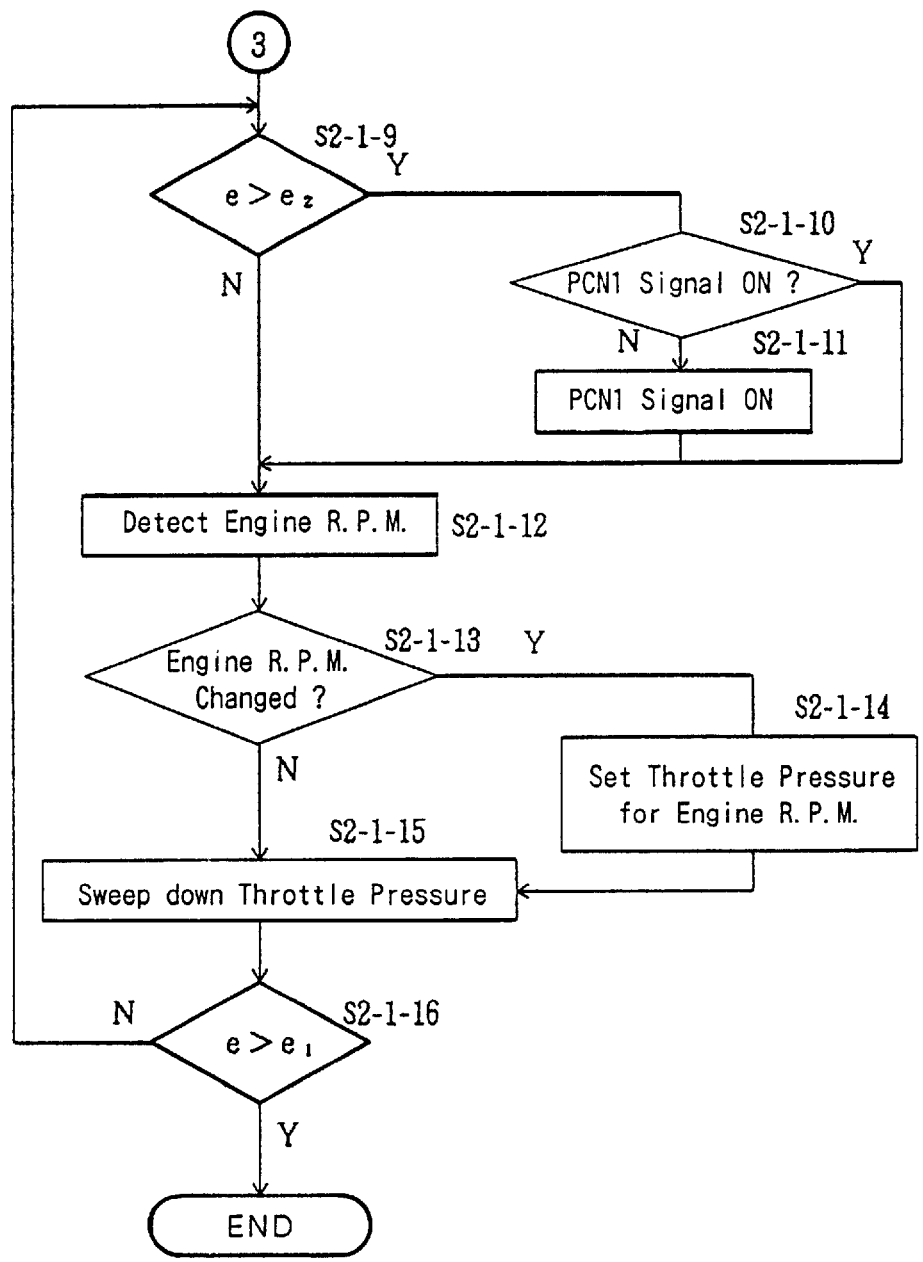
FIG. 15 is a flow chart which is a continuation of the flow chart of FIG. 14.
Figure 16:
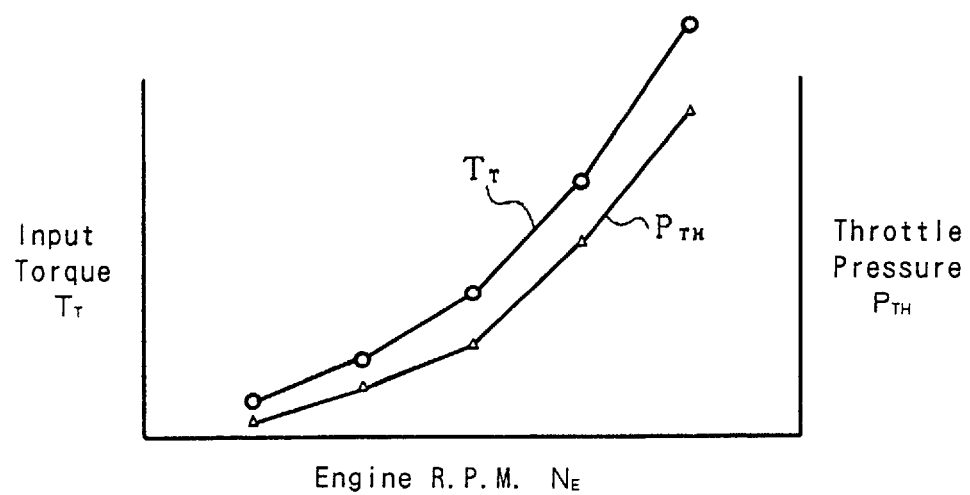
FIG. 16 is a graph of the relationship between engine R.P.M., and input torque and throttle pressure in the embodiment of FIG. 1.

The first clutch release control subroutine, i.e. Step S2-1 of FIG. 13, will be described with reference to FIGS. 14 to 16. In FIGS. 14 and 15:

Step S2-1-1: It is decided whether or not the third solenoid valve S3 is ON. The subroutine advances to Step S2-1-6, if ON, but to Step S2-1-2 if OFF. If the conditions for starting the neutral control are satisfied in the decision of Step S1-9 of FIG. 8, the third solenoid signal $S_3$ is already ON so that the subroutine transfers directly to the neutral control to start the hill hold function.

Step S2-1-2: The stop state decision means 93 (FIG. 1) estimates the vehicle speed to be zero on the basis of the change in the clutch input side R.P.M. $N_{C1}$.

Step S2-1-3: Satisfaction of the neutral control starting conditions, i.e., the conditions for starting the hill hold control and the neutral control, is awaited. If the starting conditions are satisfied, the timing operation of the first timer (not shown) is started, and the subroutine advances to Step S2-1-4.

The starting conditions which must be satisfied are: the clutch input side R.P.M. $N_{C1}$ is substantially 0; the accelerator pedal is released so that the throttle opening θ is below a predetermined value; the oil temperature detected by the oil temperature sensor 46 (FIG. 2) is over a predetermined value; and the brake pedal is depressed to turn ON the brake switch 48. Incidentally, whether or not the clutch input side R.P.M. $N_{C1}$ is substantially 0 is decided depending upon whether or not the detection limit is detected by the R.P.M. sensor 47. In this preferred embodiment, it is decided that the detection limit has been detected if the actual vehicle speed reaches a set value of, for example, 2 km/h.

Step S2-1-4: The lapse of the time period $T_1$ measured by the first timer is awaited, and the subroutine advances to Step S2-1-5 upon lapse of the time period $T_1$. The time period $T_1$ is calculated by the vehicle speed zero estimation, and it is estimated that the vehicle speed is 0 when the time period $T_1$ has elapsed.

Step S2-1-5: The third solenoid signal S3 is turned ON to bring the neutral relay valve 64 (FIG. 5) to the upper half position, where the C-1 oil pressure $P_{C1}$ is controlled.

Step S2-1-6: The 2nd speed shift output for starting the hill hold control is issued to turn ON the first solenoid signal $S_1$ for opening/closing the first solenoid valve S1, so that oil pressure is fed to the hydraulic servo B-2 of the second brake B2 to apply the second brake B2. In accordance with the rise of the oil pressure in the hydraulic servo B-2, moreover, the sequence pressure in the hydraulic servo B-2 is fed to the B-1 sequence valve 56 so that oil pressure is fed to the hydraulic servo B-1 to apply the first brake B1.

Thus, the hill hold control is executed to establish the 2nd speed gear stage in the speed change unit 16 so that the first clutch C1, the first brake B1, the second brake B2 and the fourth brake B4 are applied to lock the one-way clutches F1 and F3. In this state, if the vehicle is were to roll backward on a hill, reverse rotation would be transmitted to the output shaft 23 of the auxiliary transmission 19 to rotate the ring gear $R_1$ forward. However, this rotation is blocked by the one-way clutch F2 so that the vehicle will not roll backward.

Step S2-1-7: As shown in FIG. 16, the engine R.P.M. $N_E$, corresponding to the input torque $T_T$, is detected to set the value of the engine R.P.M. $N_E$ to a reference engine R.P.M. $N_{Em}$. FIG. 16 plots the input torque $T_T$ (=t·C·$N_E^2$) [Kg·m] and the throttle pressure $P_{TH}$ [Kg·cm$^2$] against the engine R.P.M. $N_E$ [rpm].

Step S2-1-8: The throttle pressure $P_{TH}$, just before the start of release of the first clutch C1, is determined in a manner to correspond to the engine R.P.M. $N_E$ and is used as the set oil pressure $P_1$ to reduce the C-1 oil pressure $P_{C1}$ to the set oil pressure $P_1$.

Step S2-1-9: It is decided whether or not the speed ratio e, as expressed by the foregoing equation (I), is larger than a constant $e_2$ (=0.25). The subroutine advances to Step S2-1-10, if the speed ratio e is larger than the constant $e_2$, but to Step S2-1-12 if NOT.

The constant $e_2$ is a value at the instant when the release of the first clutch C1 is slightly started. Incidentally, the speed ratio e may be replaced by the clutch input side R.P.M. $N_{C1}$.

Step S2-1-10: It is decided whether or not the PNC1 signal is ON. The subroutine advances to Step S2-1-12, if the PNC1 signal is ON, but to Step S2-1-11 if OFF.

Step S2-1-11: The engine control unit 43 turns ON the PNC1 signal to reduce the fuel injection rate in the engine 10.

The first clutch C1 is released in the N-range but applied in the D-range, so that the load upon the engine 10 is different between the two ranges. Therefore, the R.P.M. control is executed by the engine control unit 43 so that the idle R.P.M. remains constant in the N-range and the D-range. The fuel injection rate is made higher in the D-range and lower in the N-range.

In the neutral control, the first clutch C1 is released to lighten the load upon the engine 10. In the neutral control, therefore, it is also necessary to reduce the fuel injection rate. Because of the poor responsiveness of the R.P.M. control by the engine control unit 43, however, the fuel injection rate is liable to remain as is, in spite of the fact that the release of the first clutch C1 has started. This may increase fuel consumption and may cause engine racing. Accordingly, as previously described, the PNC1 signal is promptly turned ON upon initiation of release of the first clutch C1.

Step S2-1-12: The engine R.P.M. $N_E$ corresponding to the input torque $T_T$ is again detected.

Step S2-1-13: It is decided whether or not the engine R.P.M. $N_E$ has changed, as compared with the reference engine R.P.M. $N_{Em}$. The subroutine advances to Step S2-1-14, if the answer is YES, but to Step S2-1-15 if NO.

Step S2-1-14: The reference engine R.P.M. $N_{Em}$ is set at the value of the engine R.P.M. $N_E$ at the instant when it is decided at Step S2-1-13 that the engine R.P.M. $N_E$ has changed with respect to the reference engine R.P.M. $N_{Em}$, and the C-1 oil pressure $P_{C1}$ is changed to the throttle pressure $P_{TH}$ corresponding to the new reference engine R.P.M. $N_{Em}$.

Step S2-1-15: The throttle pressure $P_{TH}$, i.e., the C-1 oil pressure $P_{C1}$, is reduced (or swept down) by set pressure increments $P_{THDOWN}$ at each lapse of a set time period $T_{DOWN}$, as expressed by the following Equation:

$$P_{TH}=P_{TH}-P_{THDOWN}.$$

S2-1-16: After release of the first clutch C1 has been established, the pressure reduction of Step S2-1-15 is continued until the speed ratio e exceeds a constant $e_1$. This pressure reduction of Step S2-1-15 is stopped when the gear ratio e exceeds the constant $e_1$. This constant $e_1$ is set to 0.75, for example, in consideration of the delay of the change of the clutch input side R.P.M. $N_{C1}$ when the first clutch C1 is released. Incidentally, the speed ratio e may be replaced by the clutch input side R.P.M. $N_{C1}$.

The applied state of the first clutch C1 can not be determined based simply on the basis of whether or not the differential rotation ΔN has changed, because this differential rotation ΔN will not change regardless of whether the first clutch C1 is completely applied or released. As a result, it is difficult to distinguish between the state in which the first clutch C1 is completely applied and the state in which the first clutch C1 is released. Therefore, the state just before the application of the first clutch C1 is started is reliably restored by waiting for the speed ratio e to exceed the constant $e_1$.

Figure 17:
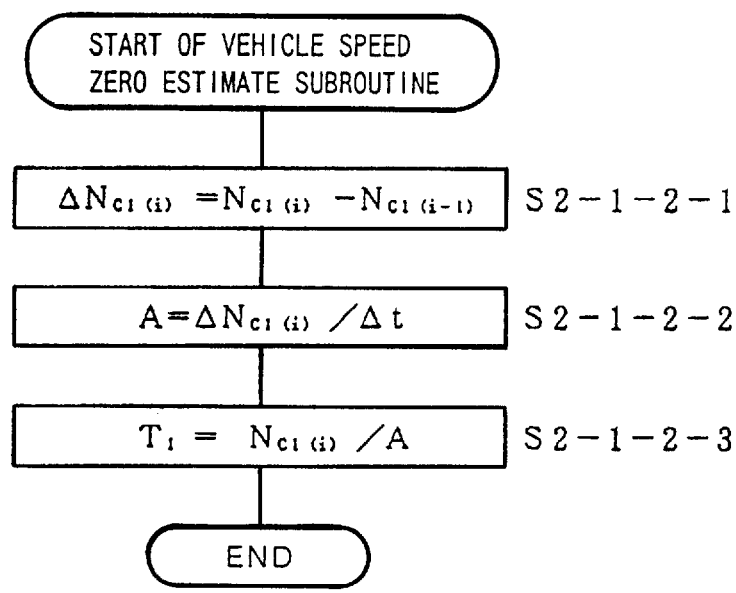
FIG. 17 is a flow chart of the vehicle speed zero estimate subroutine which is step S2-1-2 of the subroutine of FIG. 14.

The subroutine for the vehicle speed zero estimation, i.e. Step S2-1-2 of FIG. 14, will now be described with reference to FIG. 17.

Step S2-1-2-1: The R.P.M. Difference $\Delta N_{C1(i)}$ is calculated by subtracting a clutch input side R.P.M. $N_{C1(i-1)}$, at a time Δt earlier, from the present clutch input side R.P.M. $N_{C1(i)}$. For this purpose, a clock in the automatic transmission control unit 41 (FIG. 2) detects the clutch input side R.P.M. $N_{C1}$ every time period Δt.

Step S2-1-2-2: Deceleration A of the vehicle is calculated by dividing the R.P.M. Difference $\Delta N_{C1(i)}$ by the time period Δt.

Step S2-1-2-3: The time period $T_1$ until stop of the vehicle is calculated by dividing the present clutch input side R.P.M. $N_{C1(i)}$ by the deceleration A.

Figure 18:
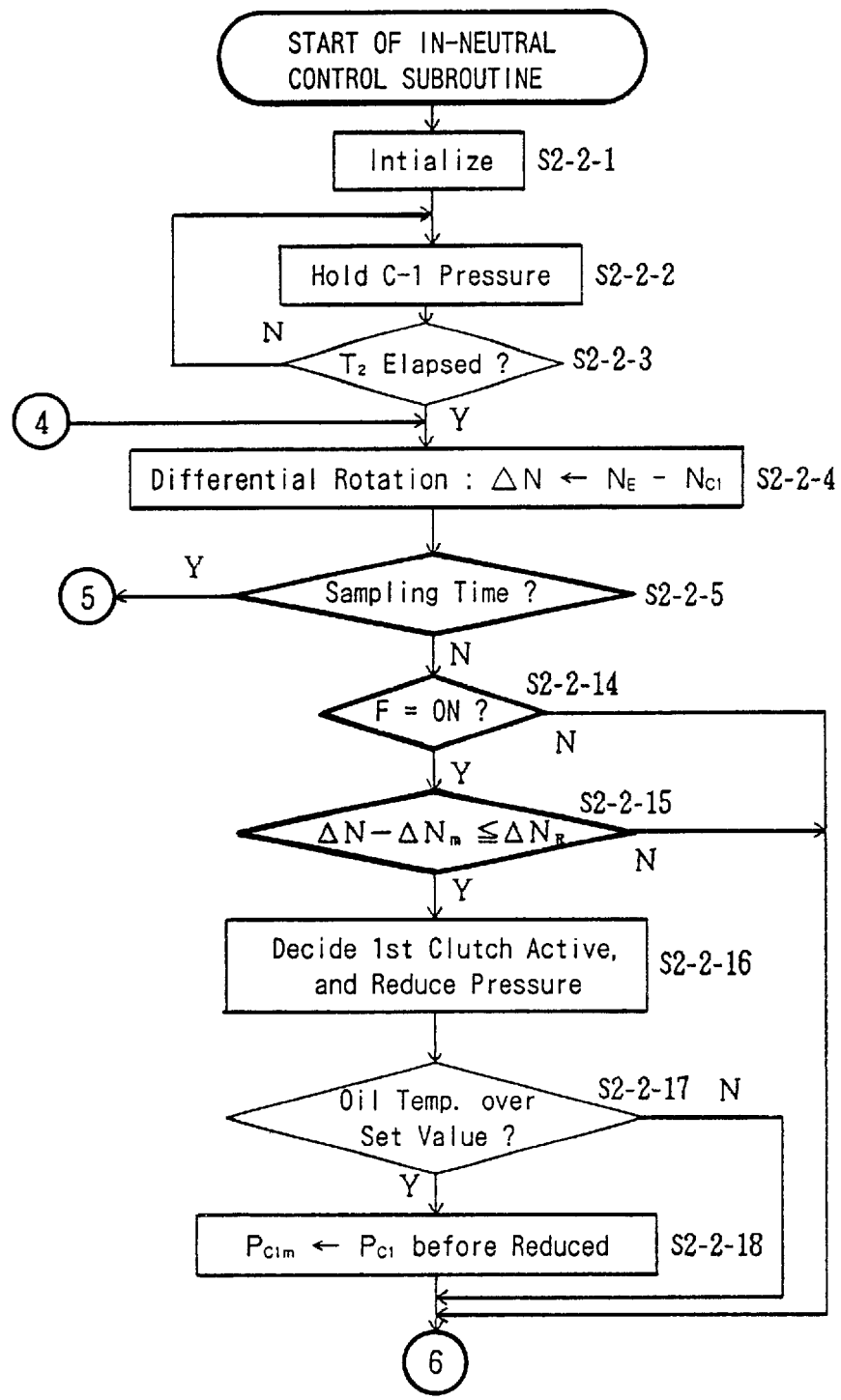
FIG. 18 is a flow chart of the in-neutral control subroutine which is step S2-2 of the subroutine of FIG. 13.
Figure 19:
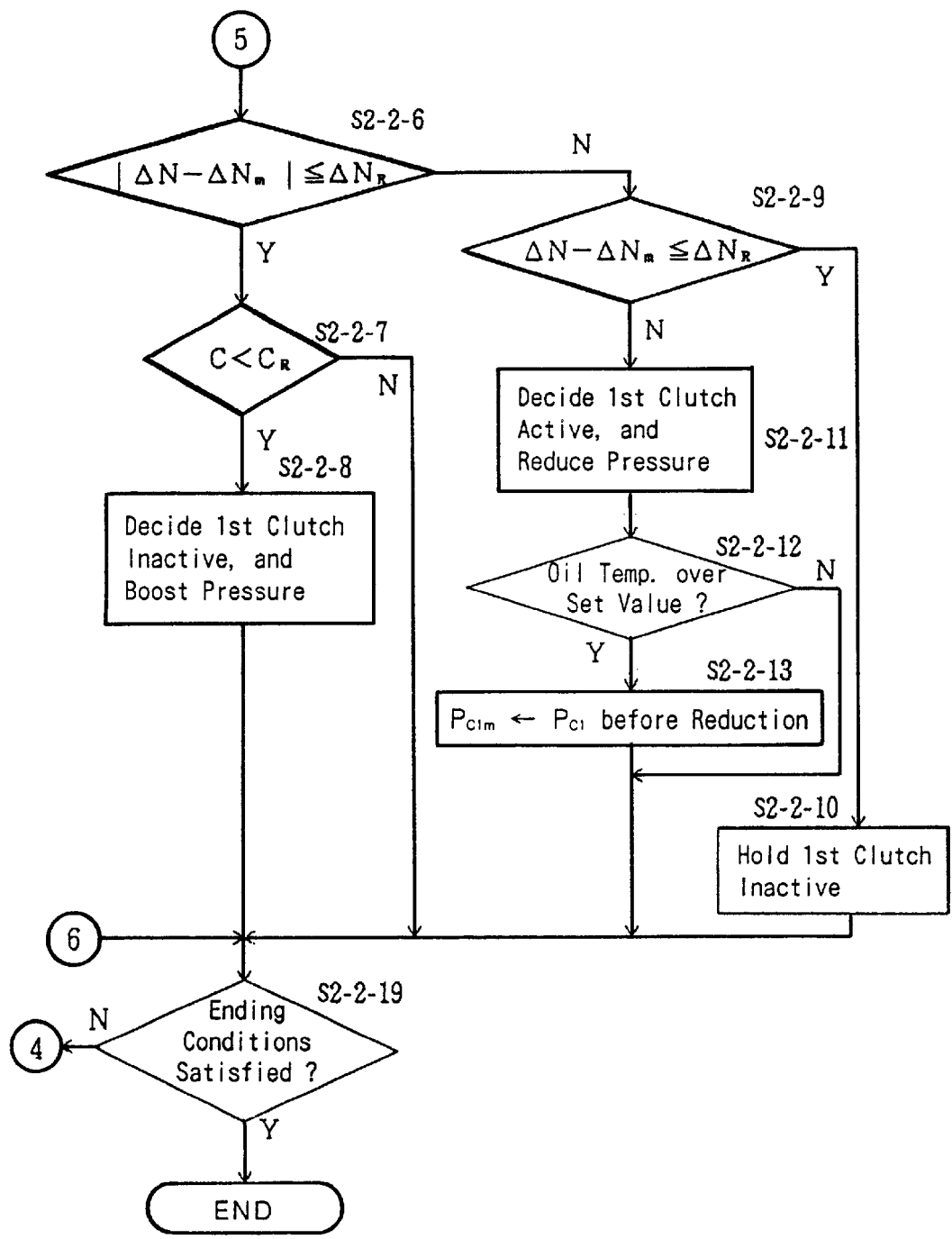
FIG. 19 is a continuation of the flow chart of FIG. 18.

The subroutine for the in-neutral control of Step S2-2 of FIG. 13 will now be described with reference to FIGS. 18 to 21. In FIGS. 18 and 19:

Step S2-2-1: An oil pressure control flag F, the count C of a counter (not shown), and the reference R.P.M. difference $\Delta N_m$ are set to the following initial values:

F←Off;

C←0; and $\Delta N_m$←the value ($N_E-N_{C1}$) at that time.

Steps S2-2-2 and S2-2-3: The C-1 oil pressure $P_{C1}$ is held at the final value of the first clutch release control. After it has been confirmed that the first clutch C1 has been released to a predetermined extent, a decision is promptly made as to whether the differential rotation ΔN has been changed. However, this decision may be mistaken due to the change in the differential rotation ΔN deriving from the pressure reduction in the first clutch release control. Therefore, a second timer (not shown) is used to continue the holding of the C-1 oil pressure $P_{C1}$ until the time period $T_2$ has elapsed. As a result, the decision as to whether or not the differential rotation ΔN has been changed is postponed to prevent the C-1 oil pressure $P_{C1}$ from being adjusted while in an unstable state just after the first clutch C1 has been released. When the time period $T_2$ has elapsed, the subroutine advances to Step S2-2-4.

Step S2-2-4: the differential rotation calculation means 953 (FIG. 1) calculates the differential rotation ΔN between the engine R.P.M. $N_E$ and the clutch input side R.P.M. $N_{C1}$.

Step S2-2-5: It is decided whether or not a preset sampling time has been reached, that is, whether or not a time period of, for example, 1.0 sec or 0.5 sec has elapsed. The subroutine advances to Step S2-2-6, if the sampling time is reached, but to Step S2-2-14 if NOT.

Figure 20:
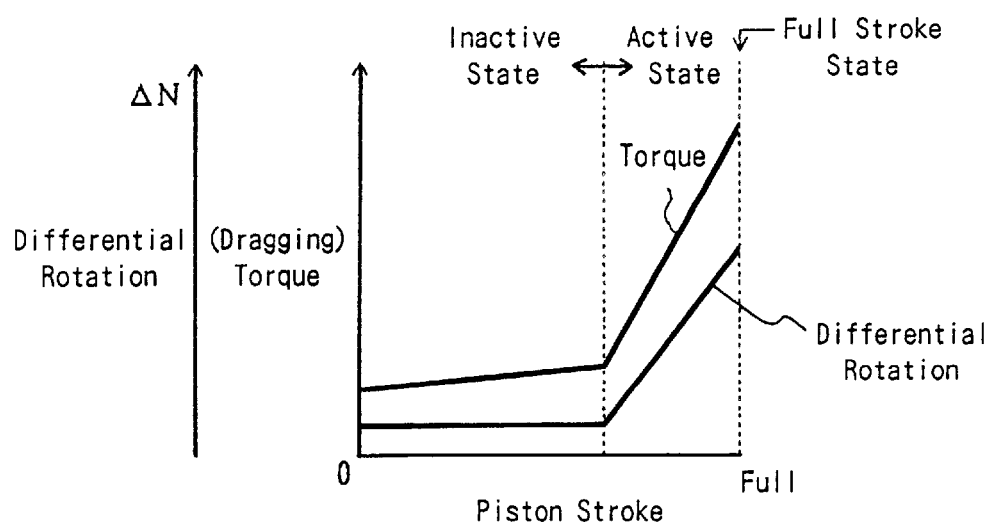
FIG. 20 is a graph illustrating the state of the first clutch under neutral control in the embodiment of FIG. 1.

Step S2-2-6: The differential rotation change decision means 954 decides whether or not the absolute value of the difference between the differential rotation ΔN and the reference differential rotation $\Delta N_m$ is below a set value $\Delta N_R$, that is, whether or not the change in the differential rotation ΔN is below the set value $\Delta N_R$. The subroutine advances to Step S2-2-7, if below the set value $\Delta N_R$, but to Step S2-2-9 if over the set value $\Delta N_R$. The value $\Delta N_R$ is set in advance to discriminate between the active state and the inactive state of the first clutch C1, as shown in FIG. 20.

The calculation of the differential rotation ΔN may be erroneous, if the signal from the engine R.P.M. sensor 49 (FIG. 2) or that from the R.P.M. sensor 47 is in error, or if the calculation itself is in error. Because the differential rotation ΔN will abruptly change if the application of the first clutch C1 is started prematurely, error in the decision that the differential rotation ΔN has changed can be prevented by making the decision only after the differential rotation ΔN exceeds the set value $\Delta N_R$.

Moreover, if the set value $\Delta N_R$ is varied according to the oil temperature, the C-1 oil pressure $P_{C1}$ can be properly controlled regardless of the temperature of the oil.

Step S2-2-7: It is decided whether or not the count C of the counter is below a set value $C_R$. The subroutine advances to Step S2-2-8, if below the set value $C_R$, but to Step S2-2-19 if over the set value $C_R$.

Figure 21:
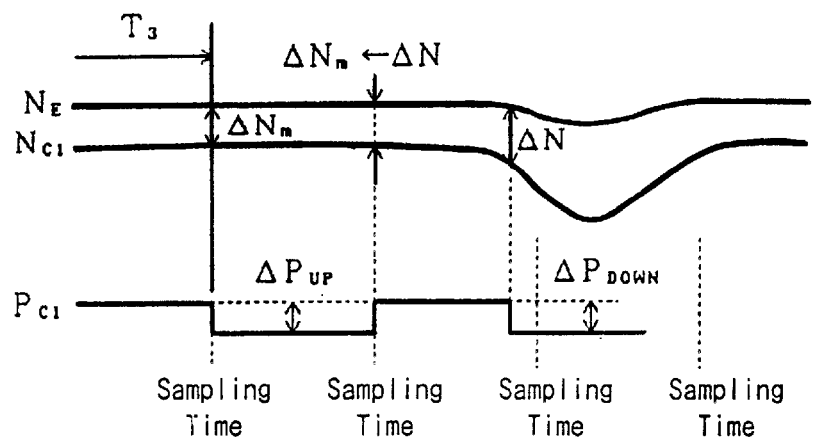
FIG. 21 is a time chart of engine R.P.M., clutch input side R.P.M. and C-1 oil pressure in neutral control in the embodiment of FIG. 1.

Step S2-2-8: The pressure boosting means 955 decides that the first clutch C1 is inactive, because of no change in the differential rotation $\Delta N$. In this state, to avoid return of the piston to an excessive extent, the C-1 oil pressure $P_{C1}$ is boosted, as shown in FIG. 21, by a set pressure $\Delta P_{UP}$, as follows:

$P_{C1} \leftarrow P_{C1} + P_{UP}$.

Moreover, the reference differential rotation $\Delta N_m$ is set to the differential rotation $\Delta N$, and the oil pressure control flag F is turned ON:

$\Delta N_m \leftarrow \Delta N$; and

F←ON.

Step S2-2-9: It is decided whether or not the change in the differential rotation $\Delta N$ has a tendency to decrease, that is, whether or not the difference between the differential rotation $\Delta N$ and the reference differential rotation $\Delta N_m$ is below the set value $\Delta N_R$. The subroutine advances to Step S2-2-10, if below the set value $\Delta N_R$, but to Step S2-2-11 if over the set value $\Delta N_R$.

Step S2-2-10: If it is decided that the first clutch C1 is in transition from the active state to the inactive state, the C-2 oil pressure $P_{C1}$ is held at its present value of that time, and the oil pressure control flag F is turned OFF:

F←OFF.

If the differential rotation $\Delta N$ has changed, this change is in the direction of a decrease in the case of transition of the first clutch C1 from the active state to the inactive state. At this time, if the C-1 oil pressure $P_{C1}$ is further reduced, the piston may abruptly return to the extent of an excessive stroke loss. Therefore, the reduction of the C-1 oil pressure $P_{C1}$ is once inhibited and held at its current value while the first clutch C1 is in transition from the active to the inactive state.

Step S2-2-11: The pressure reducing means 956 reduces the C-1 oil pressure $P_{C1}$ by a set pressure $\Delta P_{DOWN}$ because of a decision that the first clutch C1 is in transition from the inactive to the active state, as follows:

$P_{C1} \leftarrow P_{C1} - \Delta P_{DOWN}$.

Moreover, the reference differential rotation $\Delta N_m$ is set to the differential rotation $\Delta N$, and the oil pressure control flag F is turned OFF whereas the value "1" is subtracted from the count value of the counter:

$\Delta N_m \leftarrow \Delta N$;

F←OFF; and

C←C −1(or C=0 for C<0).

Step S2-2-12: It is decided whether or not the oil temperature is over a set value, e.g. 50° C. The subroutine advances to Step S2-2-13, if the oil temperature is over the set value, but to Step S2-2-19 if NOT.

Step S2-2-13: The base pressure storage means 958 sets the C-1 oil pressure $P_{C1}$, which has previously been reduced at Step S2-2-11, as a reference C-1 oil pressure $P_{C1m}$ and stores it in the storage unit 957:

$P_{C1m} \leftarrow P_{C1}$ before reduction.

Step S2-2-14: It is decided whether or not the oil pressure control flag F is ON, that is, whether or not the C-1 oil pressure $P_{C1}$ was boosted at the previous sampling. The subroutine advances to Step S2-2-15, if the oil pressure control flag F is ON, but to Step S2-2-19 if OFF.

Step S2-2-15: The differential rotation change decision means 954 decides whether or not the difference between the differential rotation $\Delta N$ and the reference differential rotation $\Delta N$, is below the set value $\Delta N_R$, because the C-1 oil pressure $P_{C1}$ was boosted at the previous sampling. The subroutine advances to Step S2-2-16, if below he set value $\Delta N_R$, but to Step S2-2-19 if over the set value $\Delta N_R$.

Step S2-2-16: The differential rotation $\Delta N$ is changed by boosting the C-1 oil pressure $P_{C1}$ of the previous sampling. As a result, the pressure reducing means 956 decides that the first clutch C1 is in the applied state, and reduces the C-1 oil pressure $P_{C1}$ by the set pressure $\Delta P_{DOWN}$:

$P_{C1} \leftarrow P_{C1} - \Delta P_{DOWN}$.

Moreover, the reference differential rotation $\Delta N_m$ is set with the differential rotation $\Delta N$, and the oil pressure control flag F is turned OFF whereas the value "1" is added to the count value of the counter, as follows:

$\Delta N_m \leftarrow \Delta N$;

F←OFF; and

C←C+1.

As previously described, it is decided whether or not the differential rotation $\Delta N$ has been changed at the instant of each sampling. When the C-1 oil pressure $P_{C1}$ is boosted in accordance with the decision, the application of the first clutch C1 may be instantly started from the released state, in which case vibration may be generated by initiation of torque transmission. Therefore, if the differential rotation $\Delta N$ is increased while the application of the first clutch C1 is being started, the C-1 oil pressure $P_{C1}$ is reduced without awaiting the subsequent sampling. Thus, the first clutch C1 is prevented from being released and idle vibration is prevented.

Moreover, the C-1 oil pressure $P_{C1}$ is changed when the change in the differential rotation $\Delta N$ is higher than the set value $\Delta N_R$ at each sampling instant, as previously described. In this case, if the differential rotation changes only in small increments, i.e. little by little, the C-1 oil pressure $P_{C1}$ may not be changed in spite of the fact that the first clutch C1 has transferred to the applied state. Therefore, the reference differential rotation $\Delta Nm$ is updated only when the C-1 oil pressure $P_{C1}$ is changed. As a result, the change of the C-1 oil pressure $P_{C1}$ can be ensured, even if the differential rotation $\Delta N$ is changed in small increments.

Step S2-2-17: It is decided whether or not the oil temperature is over the set value, e.g. 50° C. The subroutine advances to Step S2-2-18, if the oil temperature is over the set value, but to Step S2-2-19 if below the set value.

Step S2-2-18: The base pressure storage means 958 sets the C-1 oil pressure $P_{C1}$, at the level before reduction at Step S2-2-16, as the reference C-1 oil pressure $P_{C1m}$, and stores it in the storage unit 957, as follows:

$P_{C1m} \leftarrow P_{C1}$ before reduction.

Step S2-2-19: It is decided whether or not the conditions for ending the in-neutral control of the first clutch C1 are satisfied. If the ending conditions are satisfied, the in-neutral control is ended. Otherwise, the subroutine returns to Step S2-2-4, and the foregoing steps are repeated.

Incidentally, if the oil temperature is below the set value at Steps S2-2-12 and S2-2-17, the individual discs of the first clutch C1 have a higher than normal viscous resistance, which is seen as a dragging resistance. As a result, it may be erroneously decided that the application of the first clutch C1 has started. In this case, the base pressure storage means 958 will store, in the storage unit 957, a reference C-1 oil pressure $P_{C1m}$ which is lower than the oil pressure before the application of the first clutch C1 is actually started. As a result, the time period for ending the application of the first clutch C1 is prolonged to cause engine racing due to the delay in the application.

Therefore, when the oil temperature is lower than the set value, the reference C-1 oil pressure $P_{C1m}$ is not updated, but the reference C-1 oil pressure $P_{C1m}$, as stored in the storage unit 957 corresponding to normal oil temperature, is read out for use. As a result, it is possible to prevent the engine from racing.

Figure 22:
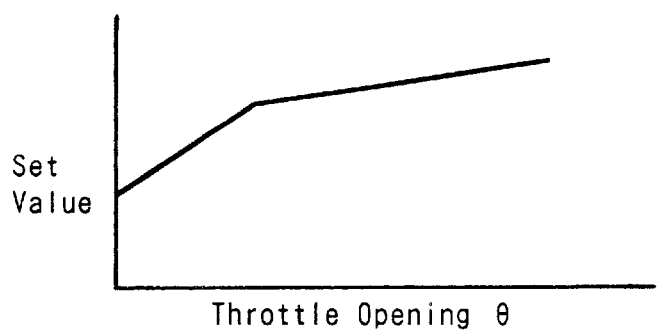
FIG. 22 is a graph of the relationship between throttle opening and a set value in the embodiment of FIG. 1.
Figure 23:
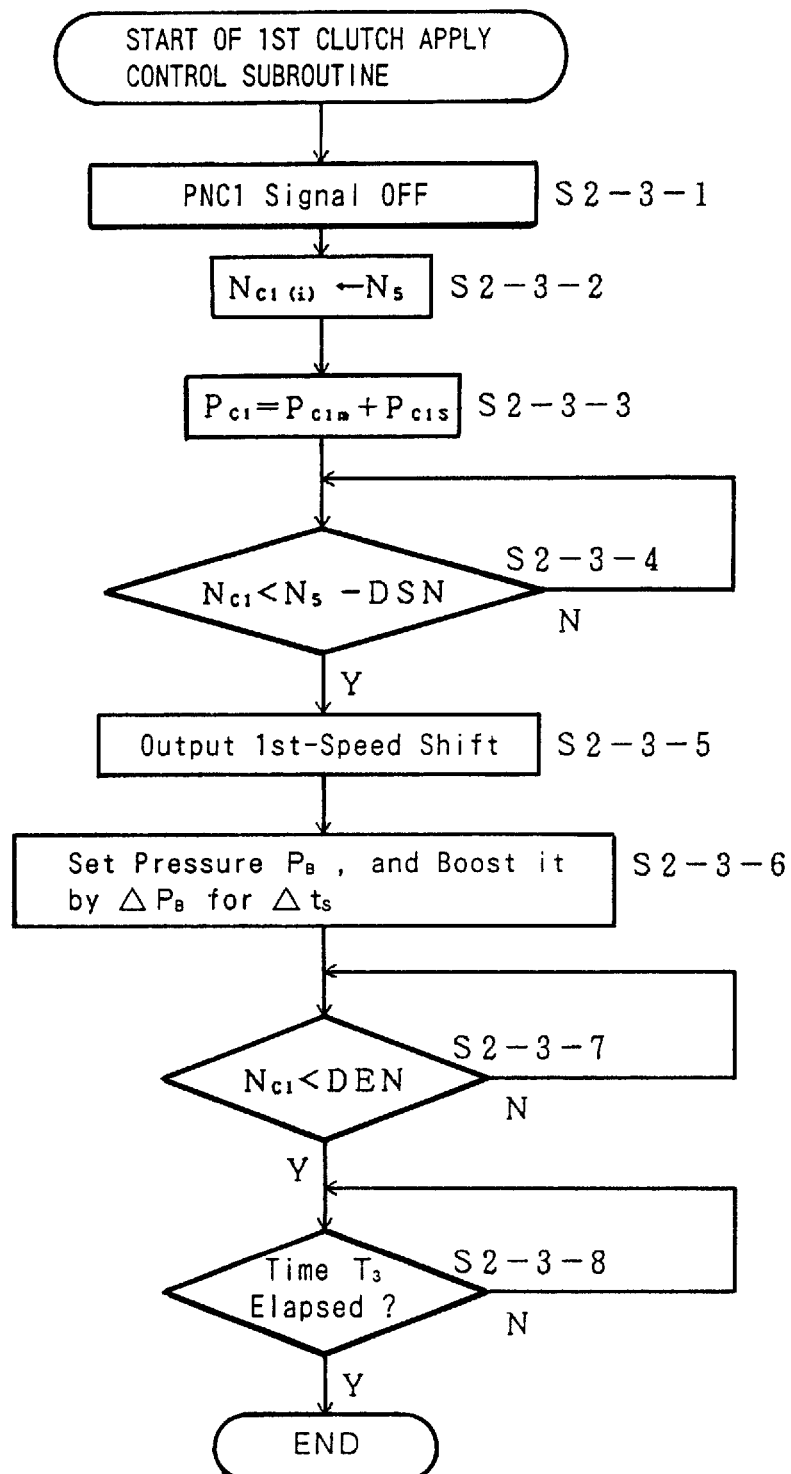
FIG. 23 is a flow chart of the 1st clutch apply control subroutine which is step S2-3 in FIG. 13.
Figure 24:
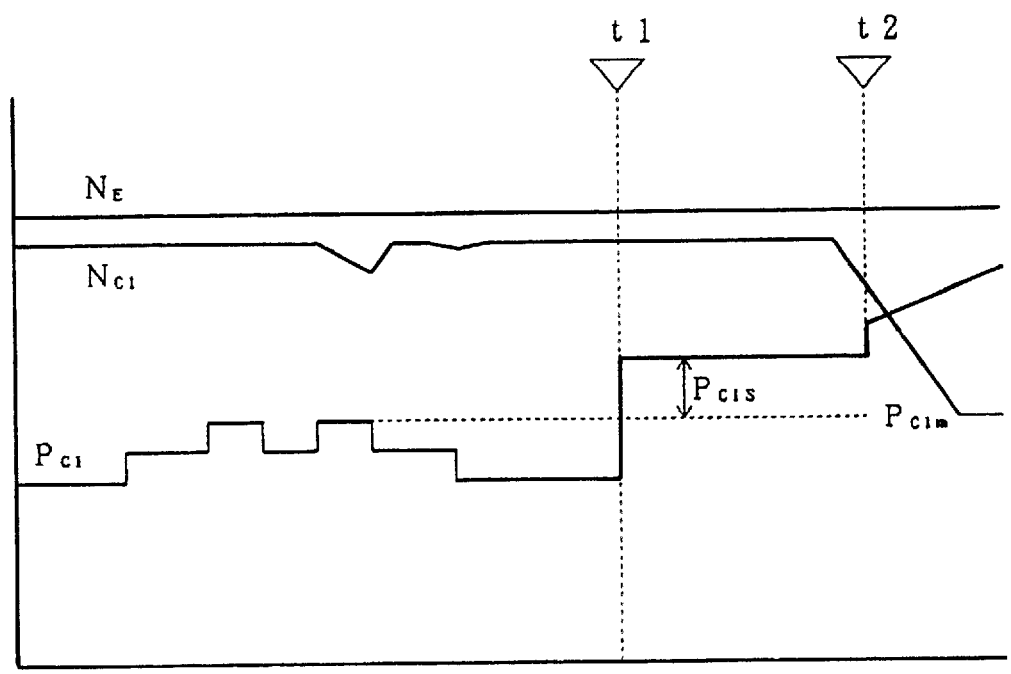
FIG. 24 is a time chart for start of drive engagement in the embodiment of FIG. 1.

The subroutine of the first clutch apply control, i.e. Step S2-3 of FIG. 13, will now be described with reference to FIGS. 22 to 24. In FIG. 23:

Step S2-3-1: When the application of the first clutch C1 is started at time t1, the signal $PNC_1$ is promptly turned OFF to restore the R.P.M. control of the engine 10 (FIG. 1) in the D-range state.

Step S2-3-2: The clutch input side R.P.M. $N_{C1(i)}$ at the instant when the in-neutral control ending conditions are satisfied is stored as a value $N_5$ in the memory of the automatic transmission control unit 41 (FIG. 2).

Step S2-3-3: The first clutch pressure boosting means 959 adds a constant $P_{C1S}$ as a shelf pressure to the reference C-1 oil pressure $P_{C1m}$ as the base pressure set at Steps S2-2-13 and S2-2-18, and sets the sum as the C-1 oil pressure $P_{C1}$. Incidentally, the constant $P_{C1S}$ is set to a value which ensures movement of the piston of the hydraulic servo C-1 (FIG. 5) and which minimizes the engaging shock generated by application of the clutch.

As a result, when the driver starts the vehicle from a stop, the constant $P_{C1S}$ is added to the reference C-1 oil pressure $P_{C1m}$ so that the oil pressure fed to the hydraulic servo C-1 is boosted to bring the first clutch C1 into a partially applied state. Subsequently, the oil pressure fed to the hydraulic servo C-1 is further boosted to bring the first clutch C1 into the completely applied state.

In this case, the reference C-1 oil pressure $P_{C1m}$, as set at Steps S2-2-13 and S2-2-18, is the C-1 oil pressure $P_{C1}$ before reduction, in case it is boosted by the pressure boosting means 955 and then reduced by the pressure reducing means 956. It is at the start of the application of the first clutch C1 that the C-1 oil pressure $P_{C1}$ is boosted by the pressure boosting means 955 and then reduced by the pressure reducing means 956. Thus, if the C-1 oil pressure $P_{C1}$ before reduction is set to the reference C-1 oil pressure $P_{C1m}$, the C-1 oil pressure $P_{C1}$ at the time of starting the application of the first clutch C1 is the reference C-1 oil pressure $P_{C1m}$.

Thus, because the C-1 oil pressure $P_{C1}$ at the time of starting the application of the first clutch C1 is used as the reference C-1 oil pressure $P_{C1m}$, the reference C-1 oil pressure $P_{C1m}$ does not fluctuate so that the partially applied state of the first clutch C1 can always be stably achieved. As a result, it is possible to prevent engaging shock and engine racing.

Step S2-3-4: the subroutine awaits the clutch input side R.P.M. $N_{C1}$ to become smaller than the difference between the value $N_5$ and a constant DSN. If the clutch input side R.P.M. $N_{C1}$ becomes smaller than the difference between the value $N_5$ from the constant DSN at time t2, the start of application of the first clutch C1 is decided, and the subroutine advances to Step S2-3-5.

Step S2-3-5: The 1st-speed shift output signal is issued.

Step S2-3-6: The second clutch pressure boosting means 960 changes the throttle pressure $P_{TH}$ coming from the linear solenoid valve 66 (FIG. 4) to boost the C-1 oil pressure $P_{C1}$ to a pressure $P_B$ and then boosts the C-1 oil pressure $P_{C1}$ by set pressure increments $\Delta P_B$ at each lapse of a time period $\Delta t_B$ to thereby continue the application of the first clutch C1.

Step S2-3-7: The subroutine waits until the clutch input side R.P.M. $N_{C1}$ becomes smaller than a constant DEN.

Step S2-3-8: A third timer (not shown) measures the time period $T_3$, the lapse of which is awaited.

In this case, the set values of the constant $P_{C1S}$, the pressure $P_B$, the set pressure $\Delta P_B$ and so on are set on the basis of variables corresponding to the input torque $T_T$ such as the throttle opening θ.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for a vehicle automatic transmission including a speed change unit and a fluid transmission unit for transmitting the rotation of an engine to the speed change unit, said control system comprising:

a clutch which is applied responsive to selection of a forward running range;

a hydraulic servo for applying said clutch responsive to an oil pressure;

an input R.P.M. sensor for detecting input R.P.M. of the fluid transmission unit;

an output R.P.M. sensor for detecting output R.P.M. of the fluid transmission unit;

stop state detection means for detecting that the vehicle is stopped;

start state decision means for detecting a start of the vehicle from a stop; and a control unit for controlling the oil pressure fed to said hydraulic servo including reduction of the oil pressure to said hydraulic servo when the vehicle is stopped to establish a neutral control in which said clutch is released, said control unit comprising:

release means for reducing the oil pressure to said hydraulic servo responsive to detection that the vehicle is stopped, said clutch release means including:

differential rotation calculation means for calculating the difference between said input R.P.M. and said output R.P.M.;

differential rotation change decision means for deciding whether or not said difference has changed;

pressure increasing means for increasing the oil pressure fed to said hydraulic servo responsive to a decision that the difference has not changed;

pressure reducing means for reducing the oil pressure fed to said hydraulic servo responsive to a decision that said difference has changed; and base pressure storage means for storing the oil pressure before reduction as a base pressure, when the oil pressure fed to said hydraulic servo is successively increased by said pressure increasing means and then reduced by said pressure reducing means; and clutch application means for applying the clutch responsive to detection of a shift of the vehicle from a stop to start and including:

first clutch pressure boosting means for boosting the oil pressure fed to said hydraulic servo, by adding a set shelf pressure increments to the base pressure until said clutch comes into a partially applied state after the shift of the vehicle from the detected stop to the detected start; and second clutch pressure boosting means for further boosting the oil pressure fed to said hydraulic servo, until said clutch becomes completely applied.

2. A control system for an automatic transmission according to claim 1, further comprising an oil temperature sensor for detecting the oil temperature of said automatic transmission, wherein said control unit determines if the detected oil temperature is higher than a set value each time the oil pressure fed to said hydraulic servo is boosted by said pressure boosting means and then reduced by said pressure reducing means and, if higher, updates the oil pressure stored as said base pressure and holds the stored base pressure without change if the detected oil temperature is lower than the set value.

3. A control system for an automatic transmission according to claim 1, wherein said differential rotation change decision means decides whether or not said difference exceeds a set value, wherein said pressure increasing means increases the oil pressure fed to said hydraulic servo, if it is decided that said difference has not exceeded the set value, and wherein said pressure reducing means reduces the oil pressure fed to said hydraulic servo, if it is decided that said difference has exceeded the set value.

4. A control system for an automatic transmission according to claim 1, wherein said differential rotation change decision means decides whether or not said difference has changed, at each lapse of a set time period.

5. A control system for an automatic transmission according to claim 1, wherein said differential rotation change decision means decides whether or not said difference has changed to exceed a set value, at each lapse of a set time period, wherein said pressure increasing means increases the oil pressure fed to said hydraulic servo, responsive to a decision that said difference has not exceeded said set value, and wherein said pressure reducing means reduces the oil pressure fed to said hydraulic servo, responsive to a decision that said difference has exceeded said set value.

6. A control system for an automatic transmission according to claim 1, wherein said differential rotation change decision means decides whether or not said difference has changed, at each lapse of a set time period, and decides whether or not said difference has decreased, if said set time period has not lapsed, and wherein said pressure reducing means reduces the oil pressure fed to said hydraulic servo, even if it is decided that said difference has decreased.

7. A control system for an automatic transmission according to claim 1, wherein said differential rotation change decision means decides whether or not said difference has exceeded a set value, at each lapse of a set time period, and decides whether or not said difference has dropped more than said set value, if said set time period has not elapsed, wherein said pressure boosting means boosts the oil pressure fed to said hydraulic servo, if it is decided that said difference has not exceeded said set value, and wherein said pressure reducing means reduces the oil pressure fed to said hydraulic servo, if it is decided that said difference has exceeded said set value and if it is decided that said difference has dropped more than said set value.

8. A control system for an automatic transmission according to claim 1, wherein said clutch application means decides the partially applied state of said clutch has been achieved on the basis of the detected output R.P.M. of said fluid transmission unit.

9. A control system for an automatic transmission according to claim 1, wherein said second clutch pressure boosting means gradually boosts the oil pressure fed to said hydraulic servo, until said clutch makes the transition from the partially applied state to the completely applied state.

10. A control system for an automatic transmission according to claim 1, wherein said stop state detection means decides that the vehicle has stopped upon detection that an accelerator pedal has been released and a brake pedal has been depressed.

11. A control system for an automatic transmission according to claim 1, wherein said start state detection means decides a transition of the vehicle from a stop to a start responsive to any one of detection that the vehicle speed is substantially above zero, detection that an accelerator pedal is depressed, and detection that a brake pedal is released.

* * * * *

UNITED STATES PATENT AND TRADEMARK OFFICE
CERTIFICATE OF CORRECTION

PATENT NO. : 5,769,753
DATED : June 23, 1998
INVENTOR(S) : KUSAFUKA et al

It is certified that error appears in the above-indentified patent and that said Letters Patent is hereby corrected as shown below:

Col. 8, line 9, "NE" should read --$N_E$--; and
line 49, "ton" should read --to--.

Col. 10, line 12, "$\theta^R$" should read --$\theta_R$--.

Col. 11, line 10, "PC1" should read --$P_{C1}$--; and
line 14, "PC1" should read --$P_{C1}$--.

Col. 14, line 6, "At" should read --$\Delta t$--.

Col. 15, line 25, "C-2" should read --C-1--.

Col. 16, line 1, "$\Delta N$," should read --$\Delta N_m$--.

Signed and Sealed this

Twenty-third Day of March, 1999

Attest:

Q. TODD DICKINSON

*Attesting Officer*   *Acting Commissioner of Patents and Trademarks*